(12) United States Patent
Ito

(10) Patent No.: US 8,000,055 B2
(45) Date of Patent: *Aug. 16, 2011

(54) CONTROL SYSTEM AND METHOD FOR LOADING ACTUATOR ARM OF ROTATING STORAGE DEVICE

(75) Inventor: Kiyotada Ito, Hiratsuka (JP)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/983,593

(22) Filed: Jan. 3, 2011

(65) Prior Publication Data

US 2011/0109986 A1 May 12, 2011

Related U.S. Application Data

(63) Continuation of application No. 12/069,795, filed on Feb. 12, 2008, now Pat. No. 7,864,480.

(60) Provisional application No. 60/889,447, filed on Feb. 12, 2007.

(30) Foreign Application Priority Data

Jun. 4, 2007 (JP) .................................. 2007-147858

(51) Int. Cl.
  G11B 21/02 (2006.01)
  G11B 5/596 (2006.01)
(52) U.S. Cl. ...................... 360/75; 360/78.04; 369/30.17
(58) Field of Classification Search ........................ None
See application file for complete search history.

(56) References Cited

U.S. PATENT DOCUMENTS

| | | | |
|---|---|---|---|
| 5,877,922 A | 3/1999 | Boutaghou | |
| 6,054,833 A | 4/2000 | Takeuchi | |
| 6,400,533 B1 | 6/2002 | Lie et al. | |
| 7,068,463 B1 | 6/2006 | Ji et al. | |
| 7,259,933 B2 | 8/2007 | Tan et al. | |
| 7,864,480 B2 * | 1/2011 | Ito | 360/75 |
| 2002/0027740 A1 | 3/2002 | Inaji et al. | |

* cited by examiner

Primary Examiner — Andrew L Sniezek

(57) ABSTRACT

A system includes a control module configured to generate a first signal to control a speed of an actuator arm of a rotating storage device. An estimating module includes a first filter configured to generate a first filtered output based on the first signal. A second filter is configured to generate a second filtered output based on the speed of the actuator arm. The estimating module is configured to estimate a force to move the actuator arm based on (i) the first filtered output and (ii) the second filtered output. The first filter and the second filter include infinite impulse response (IIR) filters of $P^{th}$ order, where P is an integer greater than 1.

20 Claims, 19 Drawing Sheets

CONTROL SYSTEM AND METHOD FOR LOADING ACTUATOR ARM OF ROTATING STORAGE DEVICE

CROSS-REFERENCE TO RELATED APPLICATIONS

This application is a continuation of U.S. patent application Ser. No. 12/069,795 filed Feb. 12, 2008, which claims the benefit of U.S. Provisional Application No. 60/889,447 filed Feb. 12, 2007. This application claims the benefit of JP 2007-147858, filed Jun. 4, 2007. The disclosures of the above applications are incorporated herein by reference in their entirety.

FIELD

The present disclosure relates to rotating storage devices, and more particularly to systems and methods for controlling an actuator arm of rotating storage devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Rotating storage systems such as magnetic disk drives and optical disc drives utilize servo control techniques based on back electromotive force (BEMF) of a voice coil motor (VCM) or data recorded on a rotating storage medium. The information is used to control movement of a head over the rotating storage medium from a current track position to a target track position during seek operations. A parking area or ramp portion for the head may be provided outside the storage medium. The head is parked on the ramp portion when not in use. In addition, the rotating storage system may include latch mechanisms that secure the head from impact when parked in the ramp portion.

The latch mechanisms typically include a magnetic latch and/or an inertia latch. The magnetic latch generally prevents the head from falling onto the storage medium due to a relatively mild impact. The magnetic latch is usually composed of a magnetic material and a magnet, in which the magnetic material is arranged on a section of an arm (e.g., the coil section of a voice coil motor (VCM)) to which the head is attached and the magnet is arranged on a housing of the storage system. Attraction between the magnetic material and the magnet opposes movement of the arm.

The inertia latch generally prevents the head from falling onto the storage medium due to a strong impact. The inertia latch is usually composed of an inertia arm having two claws—a first claw is typically arranged on the housing of the storage system and a second (opposing) claw is typically arranged on a section of the arm to which the head is attached. During an impact, the first claw moves with the inertia of impact and engages the second (opposing) claw to oppose movement of the arm.

During operation of a storage device, burst data is generally used to detect the position of the head over the storage medium. However, during load control, burst data typically cannot be read. Load control refers to the movement of the head from a parked position in the ramp portion to a position over the storage medium. During load control, burst data cannot be read. Burst data is used to detect the position of the head over the storage medium. Therefore, the load control employs speed control. Also, positioning control may be performed by using the BEMF of the VCM.

When the head is loaded (or removed from a parked position on a ramp), external forces may act on the arm. The external forces can include a frictional force between a head supporting member and the ramp, an elastic reaction force of a wiring member, and/or friction around an axis of rotation of the storage medium. Additionally, when the rotating storage system includes the ramp portion and the latch mechanism, the external forces may include an attractive force of the magnet and/or a frictional force between the claw of the inertia arm and the opposing claw. As the external forces increase, higher driving current is required to overcome the external forces. This, in turn, increases the variation in the head moving speed during feedback control. As a result, the head moving speed takes longer to attain a target value.

SUMMARY

In general, in one aspect, this specification discloses a system that comprises a control module and an estimating module. The control module controls a speed of an actuator arm when the actuator arm moves from a parked position to an edge of a rotating storage medium and generates an arm control signal. The estimating module estimates a force to move the actuator arm based on the arm control signal and the speed and generates an estimated force signal that corrects the arm control signal.

In another feature, the control module generates the arm control signal based on a difference between the speed and a target speed of the actuator arm.

In another feature, the estimating module estimates a first force when the actuator arm is in the parked position and a second force when the actuator arm moves at the speed. The first force can be greater than the second force.

In another feature, the estimating module comprises first and second filters. The first filter generates a first filtered output based on the arm control signal. The second filter generates a second filtered output based on the speed of the actuator arm. The estimating module generates the estimated force signal based on the first and second filtered outputs.

In another feature, when the actuator arm is in the parked position, the control and estimating modules generate the arm control and estimated force signals based on a first input that moves the actuator arm from the parked position. The first input is generated based on a proportional distribution of a second input that loads the actuator arm on the rotating storage medium. The first filtered output of the first filter is based on the first input and a direct current (DC) component of a transfer function of the first filter.

In another feature, the first and second filters include infinite impulse response (IIR) filters of $P^{th}$ order, in which P is an integer greater than 1.

In another feature, the first filter generates the first filtered output based on P samples of each of the arm control signal and the first filtered output. The P samples can be taken after the actuator arm moves from the parked position.

In another feature, when the actuator arm is in the parked position, the first and second filters and the control module receive first, second, and third inputs, respectively. The first, second, and third inputs can be based on coefficients of the first and second filters.

In another feature, the first, second, and third inputs are based on P samples of each of the first filtered output, the second filtered output, and the arm control signal, respectively. The P samples can be taken after the actuator arm moves from the parked position.

In another feature, a storage device comprises the system and further comprises a temperature sensor that senses a temperature of the storage device. The first input and the first filtered output can be based on the temperature. Transfer functions of the first and second filters can be based on the temperature.

In another feature, a storage device comprises the system and further comprises the actuator arm, the storage medium, and a driving module. The driving module generates a driving current based on the arm control signal and drives the actuator arm based on the driving current.

In still other features, a method comprises generating an arm control signal to control a speed of an actuator arm when the actuator arm moves from a parked position to an edge of a storage medium. The method further comprises estimating a force to move the actuator arm based on the arm control signal and the speed and generating an estimated force signal. The method further comprises correcting the arm control signal based on the estimated force signal.

In another feature, the method further comprises generating the arm control signal based on a difference between the speed and a target speed of the actuator arm.

In another feature, the method further comprises estimating a first force when the actuator arm is in the parked position and estimating a second force when the actuator arm moves at the speed. The first force can be greater than the second force.

In another feature, the method further comprises generating a first filtered output based on the arm control signal using a first filter, generating a second filtered output based on the speed of the actuator arm using a second filter, and generating the estimated force signal based on the first and second filtered outputs.

In another feature, the method further comprises generating a first input based on a proportional distribution of a second input that loads the actuator arm on the storage medium and generating the arm control and estimated force signals based on the first input when the actuator arm is in the parked position. The method further comprises generating the first filtered output based on the first input and a direct current (DC) component of a transfer function of the first filter.

In another feature, the first and second filters include infinite impulse response (IIR) filters of $P^{th}$ order, in which P is an integer greater than 1.

In another feature, the method further comprises generating P samples of each of the arm control signal and the first filtered output after the actuator arm moves from the parked position and generating the first filtered output based on the P samples.

In another feature, the method further comprises generating first, second, and third inputs based on coefficients of the first and second filters when the actuator arm is in the parked position and generating the first filtered signal, the second filtered signal, and the arm control signal based on the first, second, and third inputs, respectively.

In another feature, the method further comprises generating P samples of each of the first filtered signal, the second filtered signal, and the arm control signal after the actuator arm moves from the parked position. The method further comprises generating the first, second, and third inputs based on the P samples of each of the first filtered signal, the second filtered signal, and the arm control signal, respectively.

In another feature, the method further comprises sensing a temperature of a rotating storage device that includes the actuator arm and the storage medium. The method further comprises generating the first input and the first filtered output based on the temperature and generating transfer functions of the first and second filters based on the temperature.

In another feature, the method further comprises generating a driving current based on the arm control signal and driving the actuator arm based on the driving current.

In still other features, a system comprises control means for controlling a speed of an actuator arm when the actuator arm moves from a parked position to an edge of a rotating storage medium, wherein the control means generates an arm control signal. The system further comprises estimating means for estimating a force to move the actuator arm based on the arm control signal and the speed, wherein the estimating means generates an estimated force signal that corrects the arm control signal.

In another feature, the control means generates the arm control signal based on a difference between the speed and a target speed of the actuator arm.

In another feature, the estimating means estimates a first force when the actuator arm is in the parked position and a second force when the actuator arm moves at the speed. The first force can be greater than the second force.

In another feature, the estimating means comprises first filtering means for generating a first filtered output based on the arm control signal and second filtering means for generating a second filtered output based on the speed of the actuator arm. The estimating means generates the estimated force signal based on the first and second filtered outputs.

In another feature, when the actuator arm is in the parked position, the control and estimating means generate the arm control and estimated force signals based on a first input that moves the actuator arm from the parked position. The first input can be based on a proportional distribution of a second input that loads the actuator arm on the storage medium. The first filtered output of the first filtering means can be based on the first input and a direct current (DC) component of a transfer function of the first filtering means.

In another feature, the first and second filtering means include infinite impulse response (IIR) filters of $P^{th}$ order, in which P is an integer greater than 1.

In another feature, the first filtering means generates the first filtered output based on P samples of each of the arm control signal and the first filtered output. The P samples can be taken after the actuator arm moves from the parked position.

In another feature, when the actuator arm is in the parked position, the first and second filtering means and the control means receive first, second, and third inputs, respectively. The first, second, and third inputs can be based on coefficients of the first and second filtering means.

In another feature, the first, second, and third inputs are based on P samples of each of the first filtered output, the second filtered output, and the arm control signal, respectively. The P samples can be taken after the actuator arm moves from the parked position.

In another feature, a storage device comprises the system and further comprises temperature sensing means for sensing a temperature of the storage device. The first input and the first filtered output can be based on the temperature. Transfer functions of the first and second filtering means can be based on the temperature.

In another feature, a rotating storage device comprises the system and further comprises the actuator arm, the storage medium, and driving means for generating a driving current based on the arm control signal, wherein the driving means drives the actuator arm based on the driving current.

In still other features, a system comprises a control module and an estimating module. The control module controls a speed of an actuator arm when the actuator arm moves from a parked position to an edge of a rotating storage medium and generates an arm control signal. The estimating module includes first and second filters. The first filter generates a first filtered output based on the arm control signal. The second filter that generates a second filtered output based on the speed of the actuator arm. The estimating module estimates a force to move the actuator arm based on the first and second filtered outputs.

In another feature, the estimating module generates an estimated force signal based on the first and second filtered outputs, wherein the estimated force signal corrects the arm control signal.

In another feature, the control module generates the arm control signal based on a difference between the speed and a target speed of the actuator arm.

In another feature, the estimating module estimates a first force when the actuator arm is in the parked position and a second force when the actuator arm moves at the speed. The first force can be greater than the second force.

In another feature, when the actuator arm is in the parked position, the control and estimating modules generate the arm control and estimated force signals based on a first input that moves the actuator arm from the parked position. The first input is generated based on a proportional distribution of a second input that loads the actuator arm on the rotating storage medium. The first filtered output of the first filter can be based on the first input and a direct current (DC) component of a transfer function of the first filter.

In another feature, the first and second filters include infinite impulse response (IIR) filters of $P^{th}$ order, in which P is an integer greater than 1.

In another feature, the first filter generates the first filtered output based on P samples of each of the arm control signal and the first filtered output. The P samples can be taken after the actuator arm moves from the parked position.

In another feature, when the actuator arm is in the parked position, the first and second filters and the control module receive first, second, and third inputs, respectively. The first, second, and third inputs can be based on coefficients of the first and second filters.

In another feature, The first, second, and third inputs are based on P samples of each of the first filtered output, the second filtered output, and the arm control signal, respectively. The P samples can be taken after the actuator arm moves from the parked position.

In another feature, a storage device comprises the system and further comprises a temperature sensor that senses a temperature of the storage device. The first input and the first filtered output can be based on the temperature. Transfer functions of the first and second filters can be based on the temperature.

In another feature, a rotating storage device comprises the system and further comprises the actuator arm, the rotating storage medium, and a driving module. The driving module generates a driving current based on the arm control signal and drives the actuator arm based on the driving current.

In still other features, a method comprises generating an arm control signal to control a speed of an actuator arm when the actuator arm moves from a parked position to an edge of a rotating storage medium. The method further comprises generating a first filtered output based on the arm control signal using a first filter and generating a second filtered output based on the speed of the actuator arm using a second filter. The method further comprises estimating a force to move the actuator arm based on the first and second filtered outputs.

In another feature, the method further comprises generating an estimated force signal based on the first and second filtered outputs and correcting the arm control signal based on the estimated force signal.

In another feature, the method further comprises generating the arm control signal based on a difference between the speed and a target speed of the actuator arm.

In another feature, the method further comprises estimating a first force when the actuator arm is in the parked position and estimating a second force when the actuator arm moves at the speed. The first force can be greater than the second force.

In another feature, the method further comprises generating a first input based on a proportional distribution of a second input that loads the actuator arm on the storage medium and generating the arm control and estimated force signals based on the first input when the actuator arm is in the parked position. The method further comprises generating the first filtered output based on the first input and a direct current (DC) component of a transfer function of the first filter.

In another feature, the method wherein the first and second filters include infinite impulse response (IIR) filters of $P^{th}$ order, in which P is an integer greater than 1.

In another feature, the method further comprises generating P samples of each of the arm control signal and the first filtered output after the actuator arm moves from the parked position and generating the first filtered output based on the P samples.

In another feature, the method further comprises generating first, second, and third inputs based on coefficients of the first and second filters when the actuator arm is in the parked position and generating the first filtered signal, the second filtered signal, and the arm control signal based on the first, second, and third inputs, respectively.

In another feature, the method further comprises generating P samples of each of the first filtered signal, the second filtered signal, and the arm control signal after the actuator arm moves from the parked position. The method further comprises generating the first, second, and third inputs based on the P samples of each of the first filtered signal, the second filtered signal, and the arm control signal, respectively.

In another feature, the method further comprises sensing a temperature of a rotating storage device that includes the actuator arm and the rotating storage medium. The method further comprises generating the first input and the first filtered output based on the temperature and generating transfer functions of the first and second filters based on the temperature.

In another feature, the method further comprises generating a driving current based on the arm control signal and driving the actuator arm based on the driving current.

In still other features, a system comprises control means for controlling a speed of an actuator arm when the actuator arm moves from a parked position to an edge of a rotating storage medium, wherein the control means generates an arm control signal. The system further comprises estimating means for estimating a force to move the actuator arm. The estimating means includes first filtering means for generating a first filtered output based on the arm control signal and second filtering means for generating a second filtered output based on the speed of the actuator arm. The estimating means estimates the force based on the first and second filtered outputs.

In another feature, the estimating means generates an estimated force signal based on the first and second filtered outputs, wherein the estimated force signal corrects the arm control signal.

In another feature, the control means generates the arm control signal based on a difference between the speed and a target speed of the actuator arm.

In another feature, the estimating means estimates a first force when the actuator arm is in the parked position and a second force when the actuator arm moves at the speed. The first force can be greater than the second force.

In another feature, when the actuator arm is in the parked position, the control and estimating means generate the arm control and estimated force signals based on a first input that moves the actuator arm from the parked position. The first input can be based on a proportional distribution of a second input that loads the actuator arm on the storage medium. The first filtered output of the first filtering means can be based on the first input and a direct current (DC) component of a transfer function of the first filtering means.

In another feature, the first and second filtering means include infinite impulse response (IIR) filters of $P^{th}$ order, in which P is an integer greater than 1.

In another feature, the first filtering means generates the first filtered output based on P samples of each of the arm control signal and the first filtered output. The P samples can be taken after the actuator arm moves from the parked position.

In another feature, when the actuator arm is in the parked position, the first and second filtering means and the control means receive first, second, and third inputs, respectively. The first, second, and third inputs can be based on coefficients of the first and second filtering means.

In another feature, the first, second, and third inputs are based on P samples of each of the first filtered output, the second filtered output, and the arm control signal, respectively. The P samples can be taken after the actuator arm moves from the parked position.

In another feature, a storage device comprises the system and further comprises temperature sensing means for sensing a temperature of the storage device. The first input and the first filtered output are based on the temperature. Transfer functions of the first and second filtering means are based on the temperature.

In another feature, a storage device comprises the system and further comprises the actuator arm, the storage medium, and driving means for generating a driving current based on the arm control signal, wherein the driving means drives the actuator arm based on the driving current.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. The detailed description and specific examples, while indicating various embodiments of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
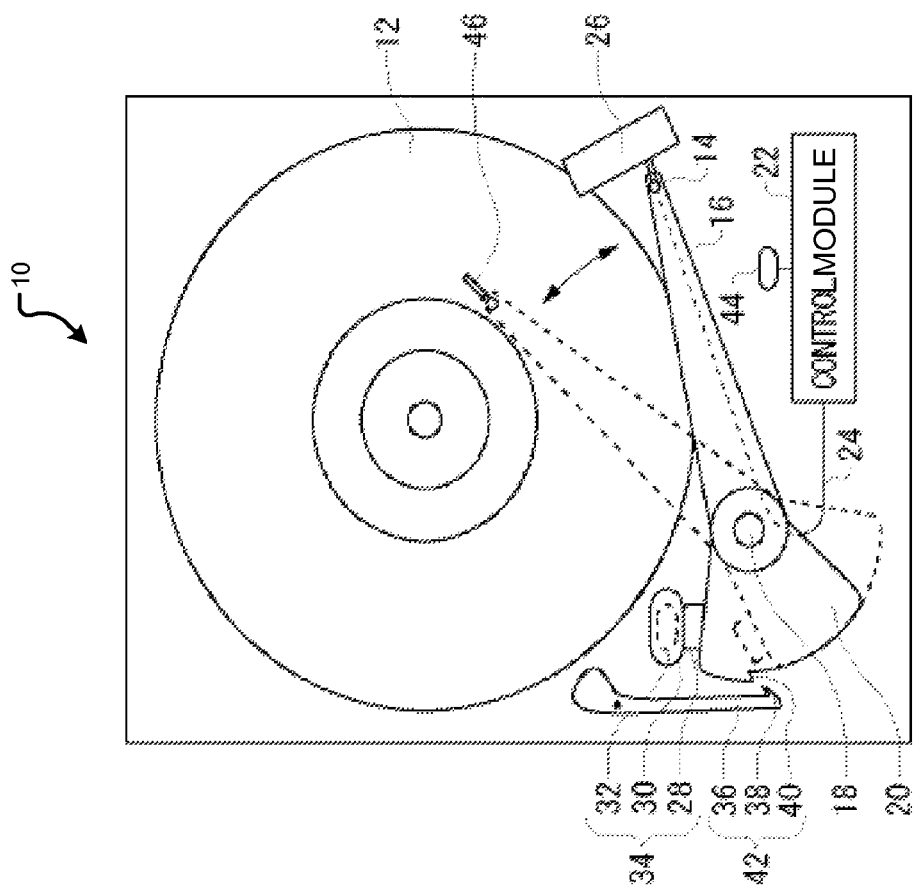
FIG. 1 is a schematic of a rotating storage system according to one implementation of the present disclosure.

The following description is merely exemplary in nature and is not intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. ISteps within one or more methods described below may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

FIG. 1 illustrates a rotating storage system 10 in accordance with one implementation of the present disclosure. The storage system 10 includes a storage medium 12 (such as a disk or a disc), a head 14, an arm 16, a driving section 20, a control module 22, a connecting wire 24, a ramp portion 26, a magnetic latch 34, an inertia latch 42, a temperature sensor 44, and a tab 46.

The storage medium 12 may magnetically or optically record data. The head 14 may magnetically or optically write data on the storage medium 12 or read data recorded on the storage medium 12.

In one implementation, the driving section 20 rotates the arm 16 about an axis 18 in order to move the head 14. In one implementation, a variable driving current input to the driving section 20 determines a moving speed of the arm 16. Accordingly, the driving section 20 can move the arm 16 to load the head 14 from the ramp portion 26 to the storage medium 12. Additionally, the driving section 20 moves the arm 16 to a target position over or outside the storage medium 12.

In one implementation, the driving section 20 comprises a coil section and a permanent magnet of a voice coil motor (VCM) (not shown). In one implementation, the coil section is provided on a movable constituent, and the permanent magnet is provided on the housing of the VCM. In this implementation, when current is applied to the coil section, the driving section 20 generates a driving force to move the arm 16.

In one implementation, the control module 22 controls operations associated with writing (or recording) onto and reading data from a storage medium. Additionally, (in one implementation) the control module 22 controls the moving speed of the arm 16 when the head 14 is loaded. The connecting wire 24 connects the control module 22 to the driving section 20 and the head 14.

The ramp portion 26 generally houses the head 14 when the head is moved away from the storage medium 12. In one implementation, the ramp portion 26 prevents the head 14 from impacting the surface of the storage medium 12 when the head 14 is not in use. In one implementation, the tab 46 (located at a radially outer end of the arm 16 relative to the head 14) guides the arm 16 when the head 14 is parked in the ramp portion 26.

The magnetic latch 34 and the inertia latch 42 improve the impact resistance of the head 14 when the head 14 is parked in the ramp portion 26. In one implementation, the magnetic latch 34 includes a magnetic material 28, a magnet 30, and a rubber covering 32. In one implementation, the magnetic material 28 is arranged on the surface of the coil of the driving section 20, and the magnet 30 is arranged on the housing of the storage system 10. The magnet 30 may include an electromagnet that can attract the magnetic material 28. The rubber covering 32 may be made of an elastic material and may cover a portion of the magnet 30 that is in contact with the magnetic material 28.

In one implementation, the inertia latch 42 includes an inertia arm 36 having a claw 38 and is arranged on the housing of the storage system 10. The claw 38 moves in response to the force of an impact. Additionally, the inertia latch 42 includes another claw 40 that is arranged on the driving section 20 so as to engage the claw 38 during an impact and oppose movement of the arm 16. In the absence of an impact, the claw 38 on the housing does not engage the claw 40 on the driving section 20. However, when the head 14 is loaded, the claws 38 and 40 may contact each other and generate contact resistance.

In one implementation, the temperature sensor 44 measures a temperature within the storage system 10 and outputs corresponding temperature data to the control module 22. Based on the variation in the temperature data, (in one implementation) the control module 22 varies a control value that controls the moving speed of the arm 16.

In one implementation, the control module 22 positions the head 14 at a target position over the storage medium 12 using two control sequences. The first control sequence (also referred to herein as a seek control sequence) moves the head 14 to an approximate target position using speed control. Subsequently, the second control sequence positions the head 14 at the target position. In one implementation, the second control sequence positions the head 14 at the target position based on burst data read by the control module 22 from the storage medium 12.

Figure 2:
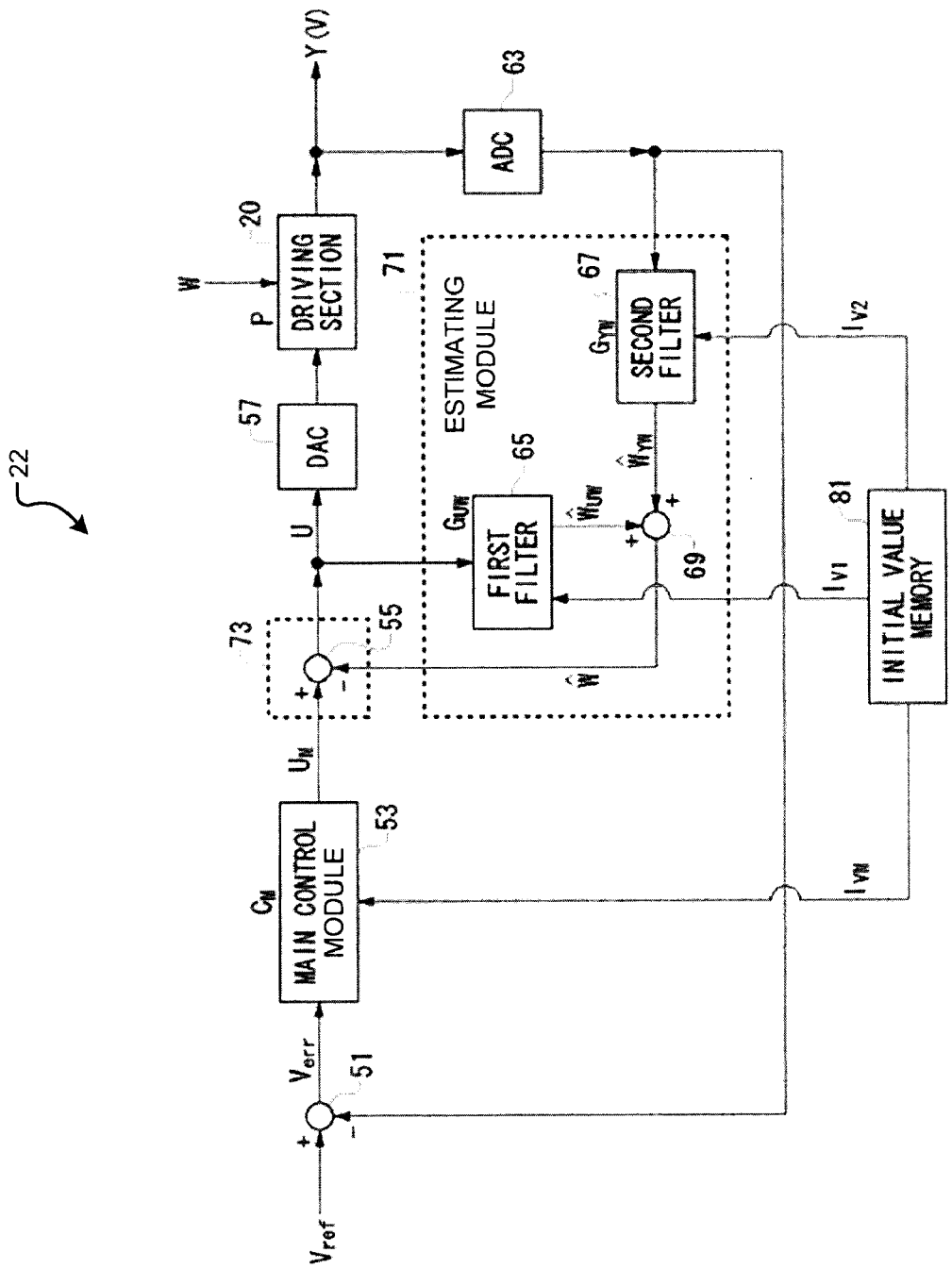
FIG. 2 is a functional block diagram of an exemplary control module of the storage system according to one implementation of the present disclosure.
Figure 6A:
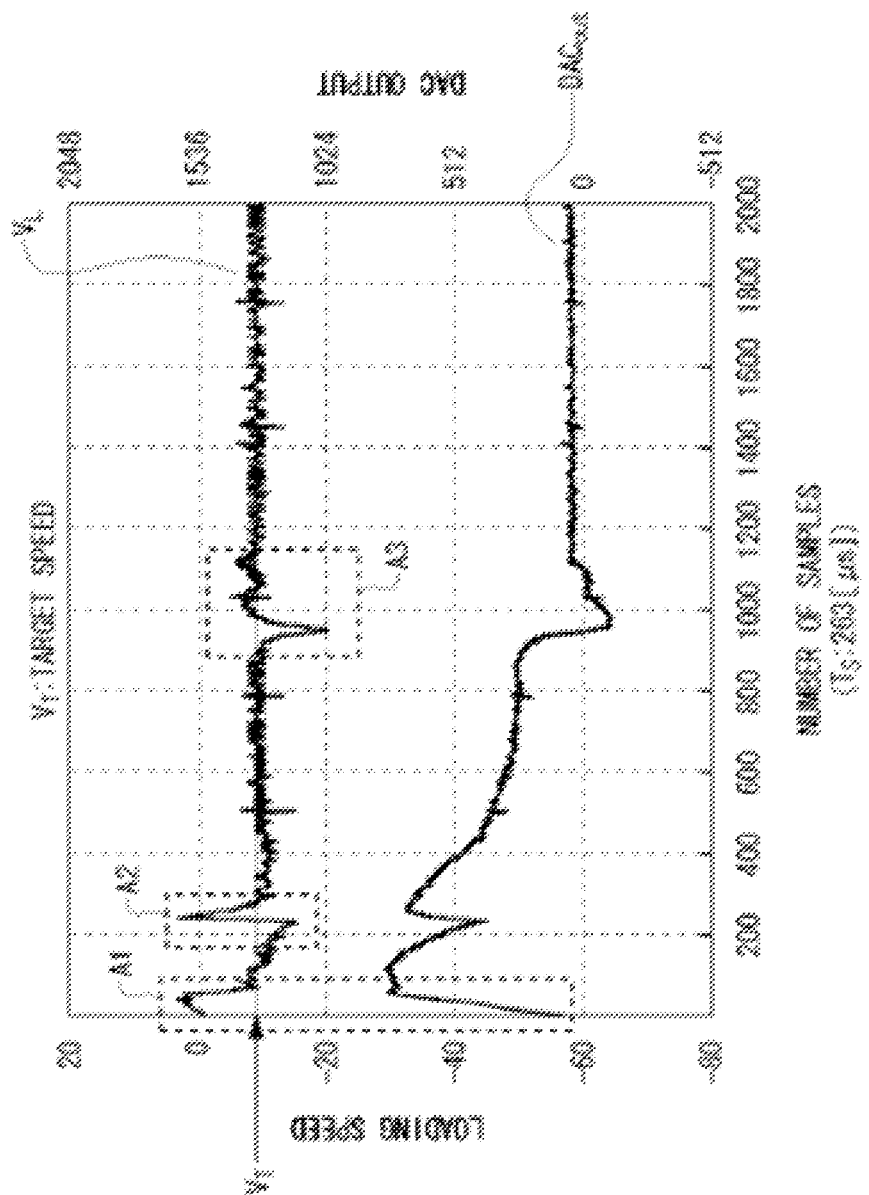
FIG. 6A shows the effect of not using an estimating module, a correcting module, and an initial value memory on loading speed $V_L$ and driving current according to one implementation of the present disclosure.
Figure 6B:
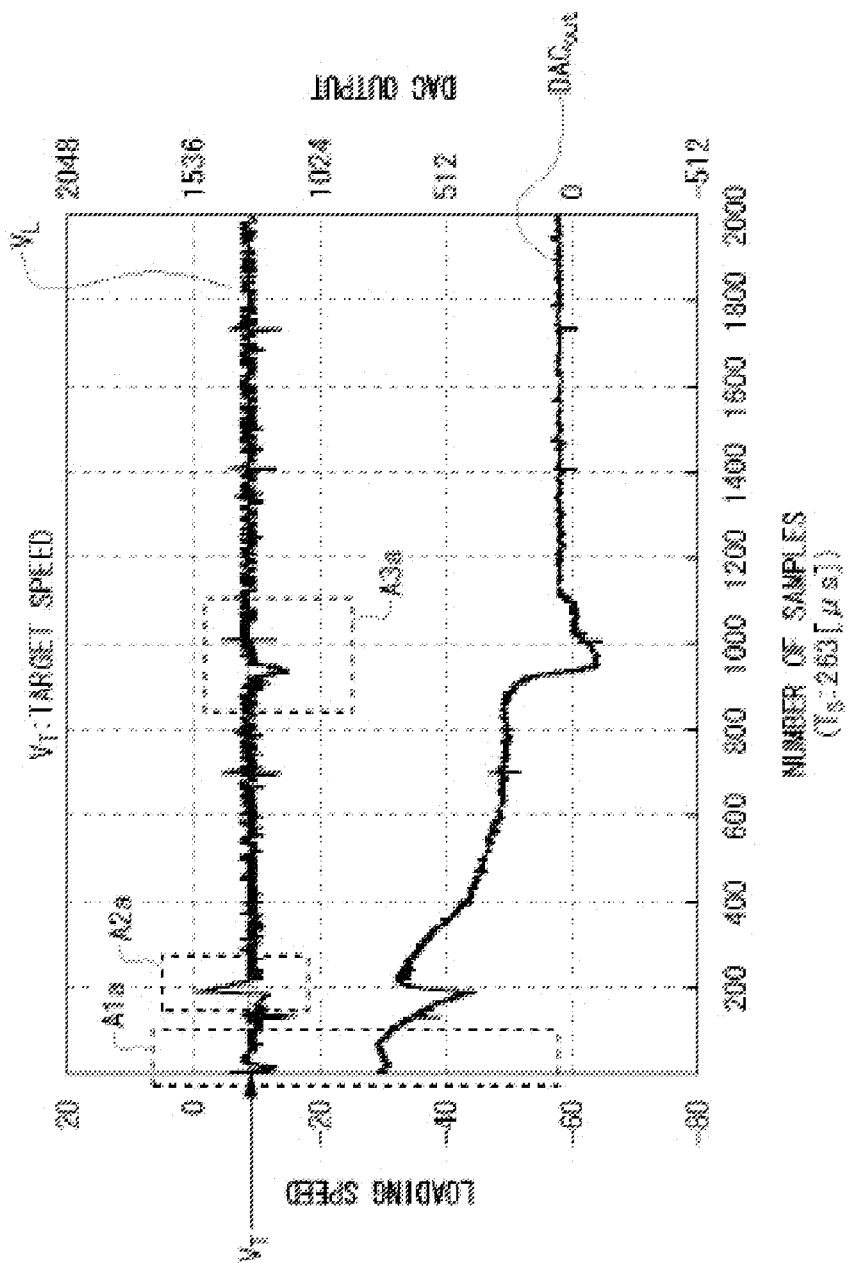
FIG. 6B shows the effect of using an estimating module, a correcting module, and an initial value memory on loading speed $V_L$ and driving current according to one implementation of the present disclosure.
Figure 7A:
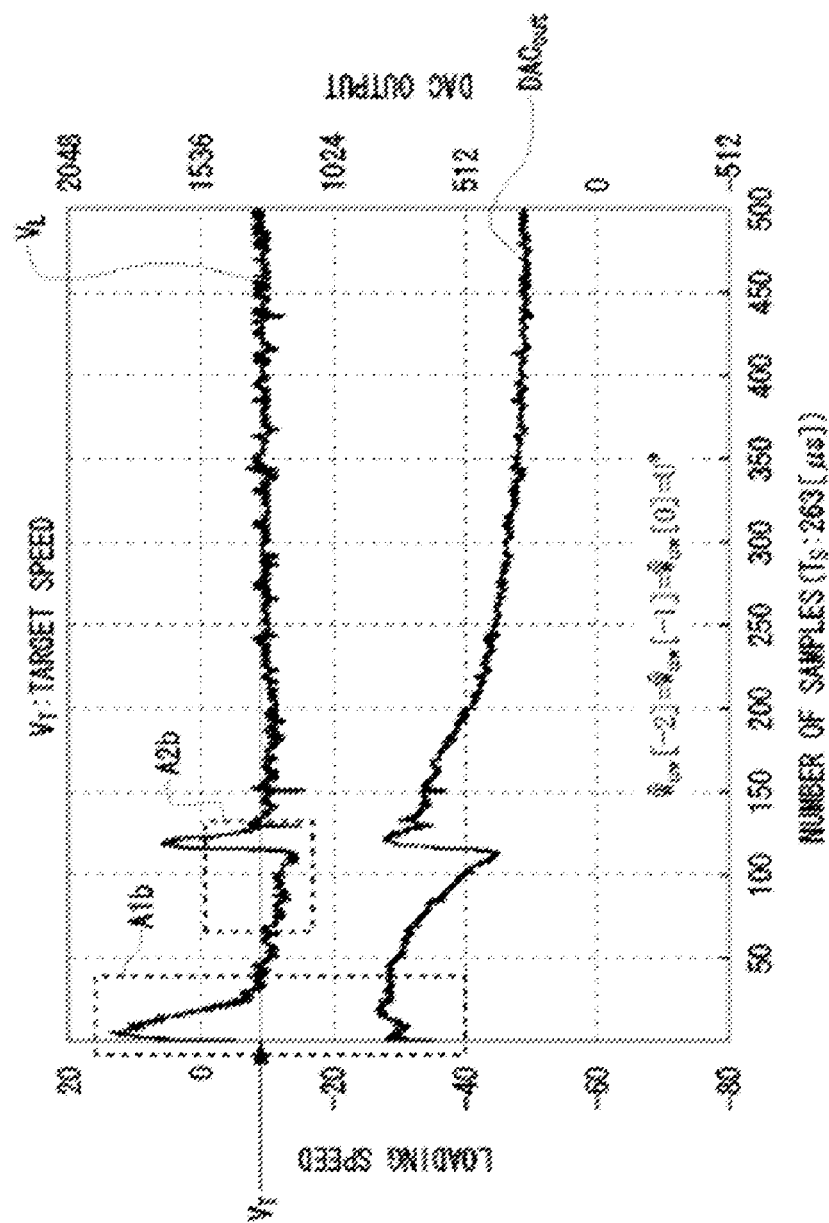
FIG. 7A shows loading speed $V_L$ and driving current when an initial value is set for the estimating module according to one implementation of the present disclosure.
Figure 7B:
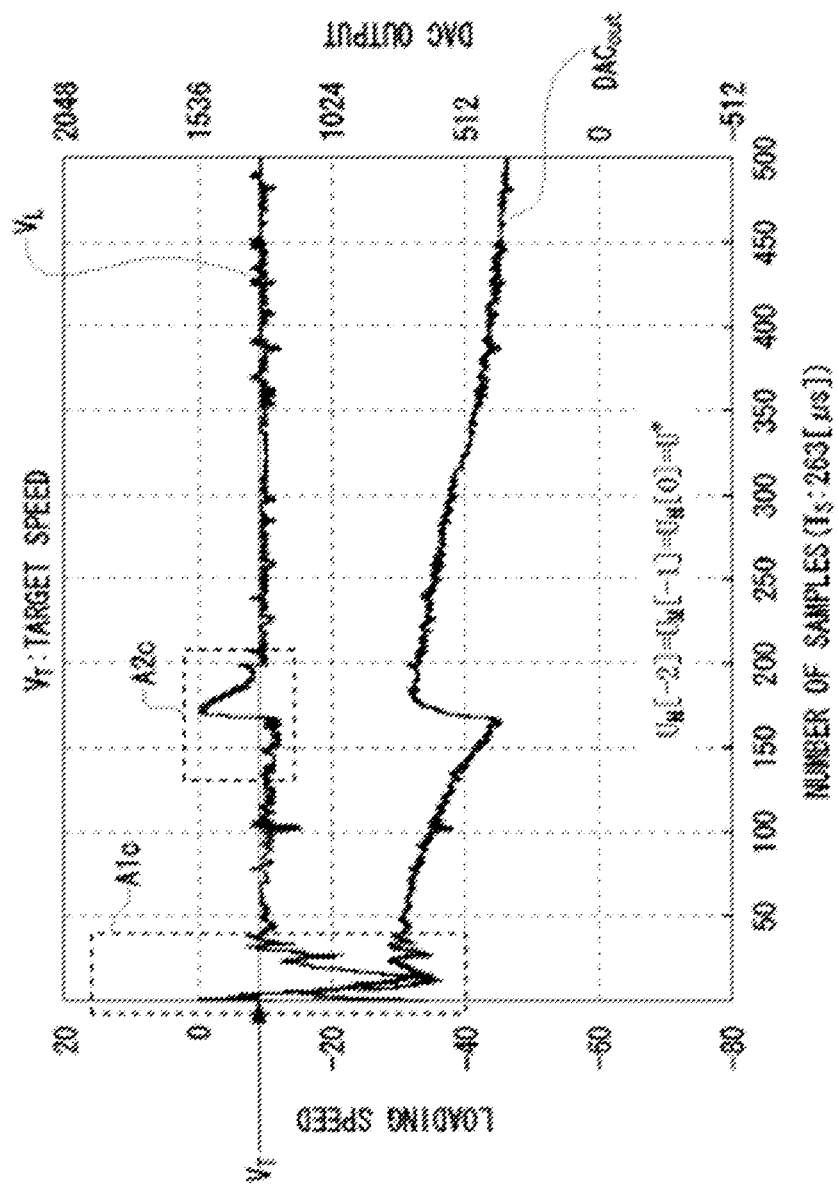
FIG. 7B shows the loading speed $V_L$ and driving current when the initial value is set for the main control module according to one implementation of the present disclosure.
Figure 7C:
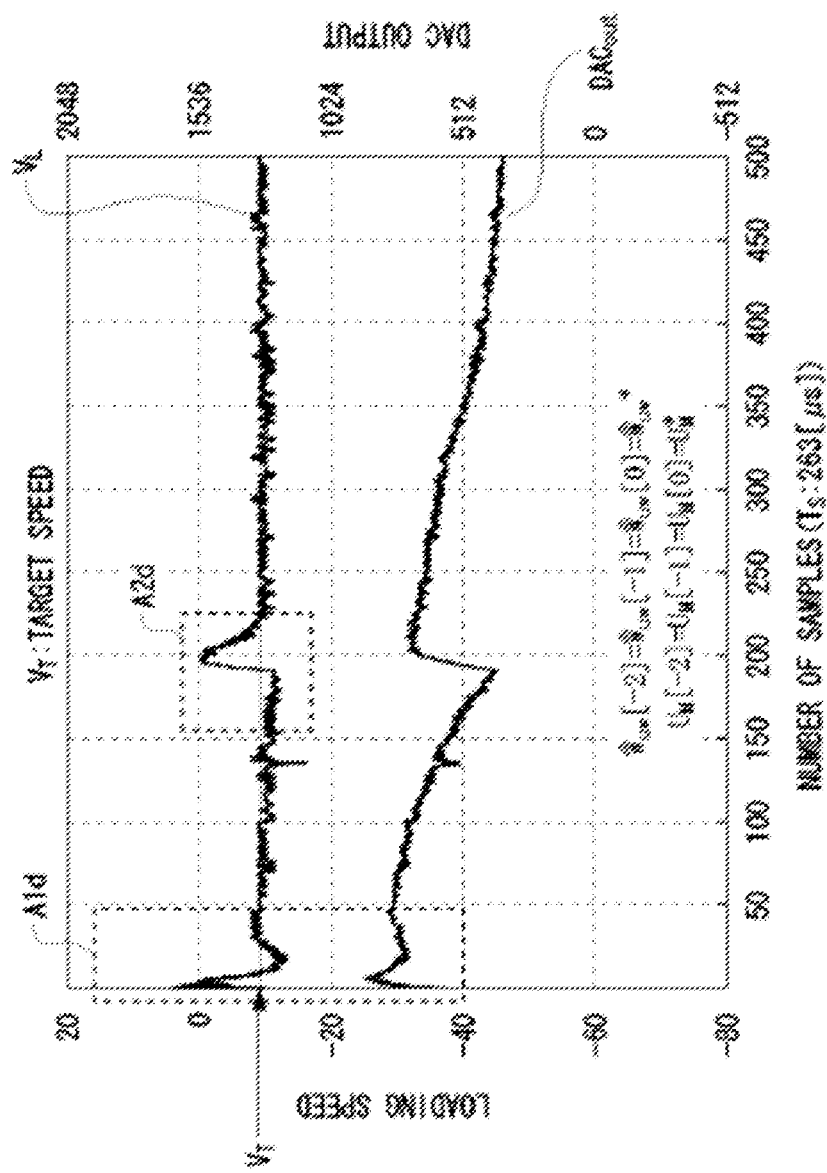
FIG. 7C shows the loading speed $V_L$ and driving current when initial values are set for the estimating module and main control module according to one implementation of the present disclosure.
Figure 8:
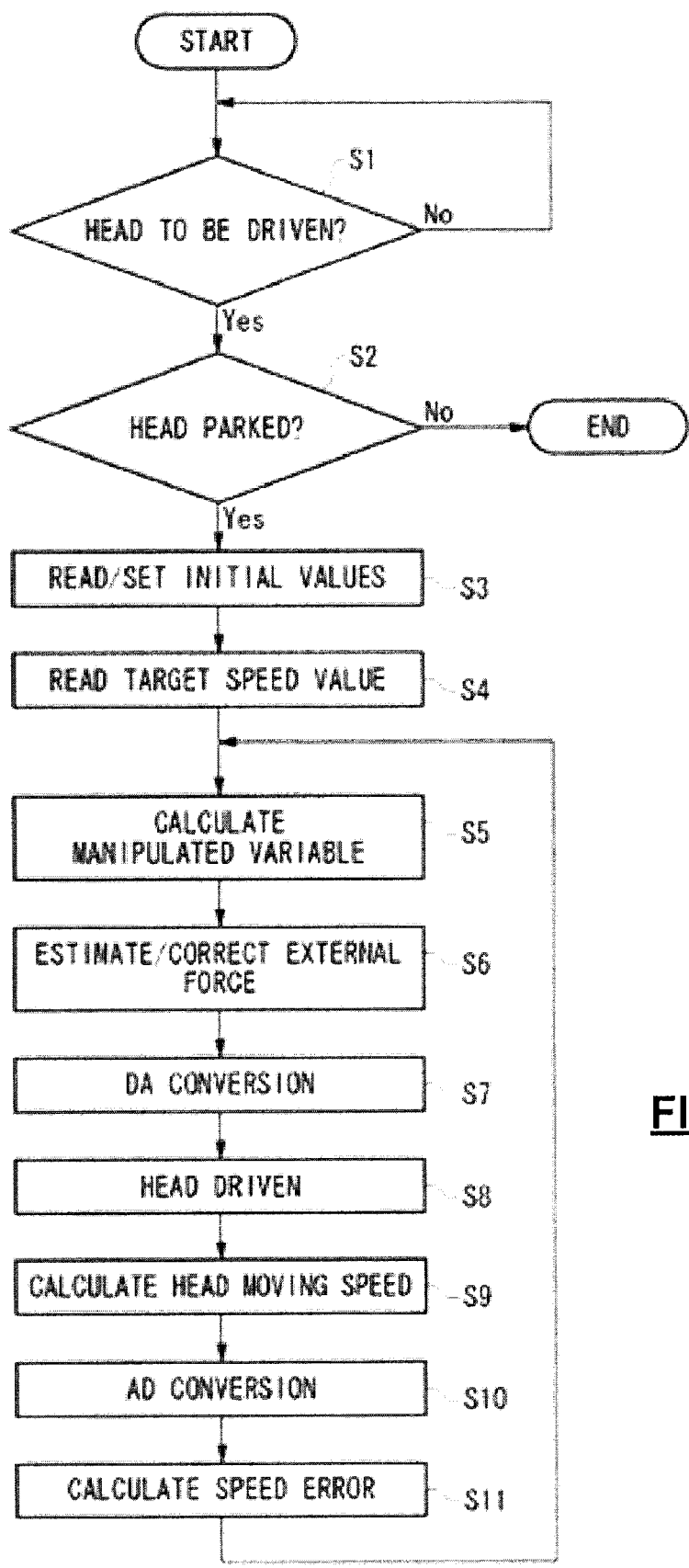
FIGS. 8 and 9 are flowcharts of an exemplary method for loading heads of the storage system according to one implementation of the present disclosure.
Figure 9:
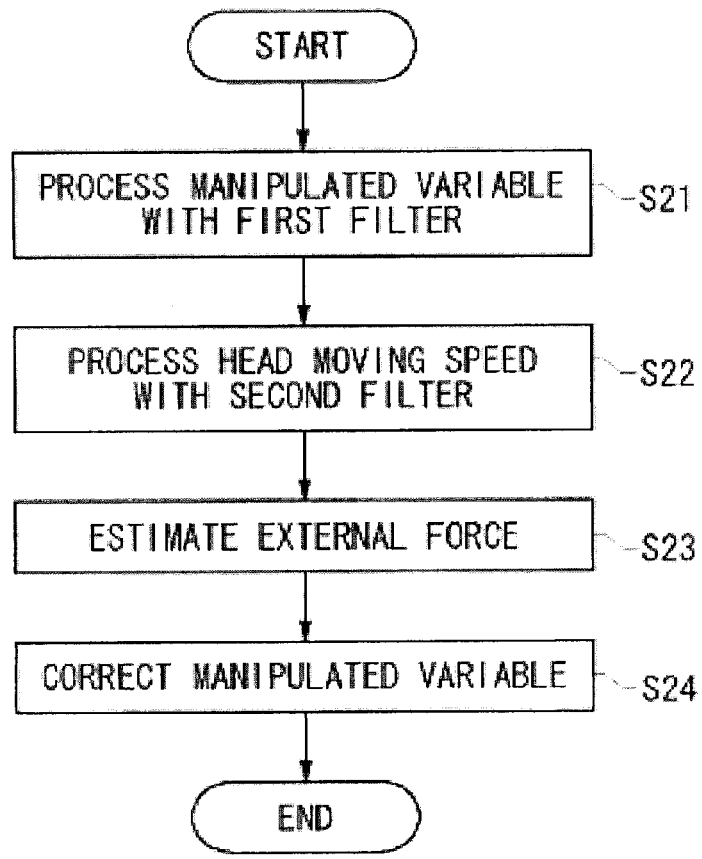
Figure 10:
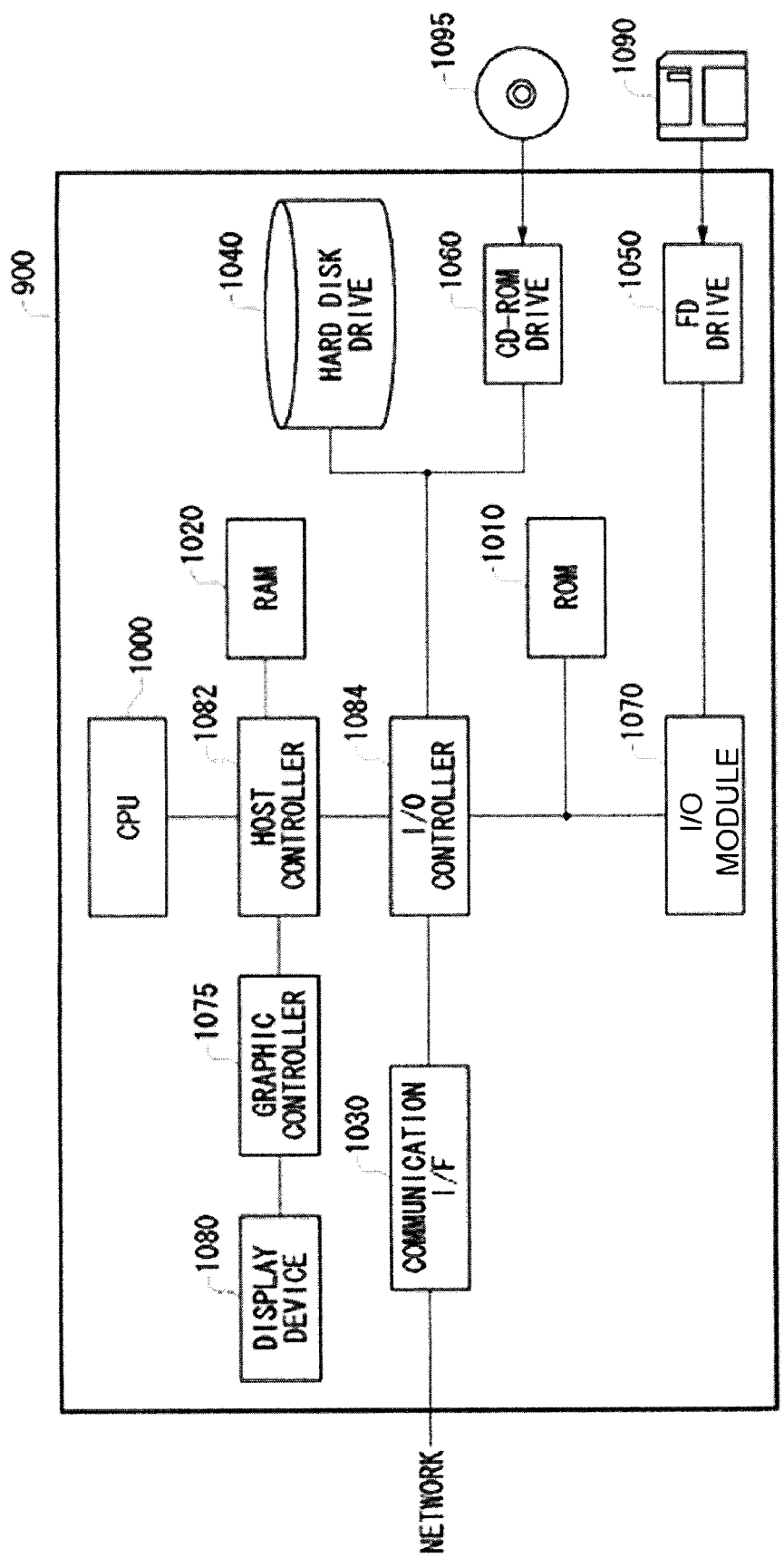
FIG. 10 is a functional block diagram of an exemplary computer that uses the storage system according to one implementation of the present disclosure.

Before a detailed discussion is presented, a brief description of drawings is presented. FIG. 2 shows a block diagram of a control module that controls the loading and positioning of the arm 16 according to one implementation of the present disclosure. FIGS. 3A-5B show Bode diagrams of various transfer functions. FIGS. 6A and 6B show the effects of not using and using the teachings of the present disclosure on the loading speed and driving current. FIGS. 7A-7C show the effects of selectively setting initial values for feedback control on the loading speed and driving current. FIGS. 8 and 9 show flowcharts for a method for controlling the loading and positioning of the arm 16. FIG. 10 shows an exemplary computer that uses a rotating storage system according to the present disclosure. FIGS. 11A-11E show various exemplary implementations incorporating the teachings of the present disclosure.

FIG. 2 illustrates one implementation of the control module 22. As shown in FIG. 2, the control module 22 includes a main control module 53, a correcting module 55, a digital-to-analog converter (DAC) module 57, the driving section 20, an analog-to-digital converter (ADC) module 63, an estimating module 71, and an initial value memory 81. The main control module 53 generates a manipulated variable $U_M$ based on actual and target speeds of the arm 16. The estimating module 71 estimates an external force W (e.g., an estimated external force $\hat{W}$) to be applied to the arm 16 when the driving section 20 moves the arm 16. A correcting module 73 corrects $U_M$ based on $\hat{W}$ and generates a corrected manipulated variable U. The DAC module 57 generates a driving current based on $U_M$. In one implementation, the driving section 20 drives the arm 16 based on the driving current generated by the DAC module 57.

In operation, the ADC module 63 generates an output proportional to the speed of the arm 16. An adding module 51 adds the output of the ADC module 63 to a target speed $V_{ref}$ and outputs a speed error $V_{err}$. The speed error $V_{err}$ is the difference between the actual moving speed of the arm 16 and a target speed $V_{ref}$. In one implementation, the target speed $V_{ref}$ is a predetermined target loading speed of the arm 16 that can be stored in the control module 22. Alternatively, the target speed $V_{ref}$ may be read from a device external to the rotating storage system 10.

More specifically, the main control module 53 controls the moving speed of the arm 16 and has a transfer function $C_M$. The main control module 53 receives $V_{err}$, performs feedback control based on $V_{err}$, and outputs $U_M$ that corresponds to a moving speed Y(V) of the arm 16. The main control module 53 may comprise a controller that performs feedback control to minimize the speed error $V_{err}$. When the main control module 53 detects that the actual moving speed of the arm 16 is not equal to the target speed $V_{ref}$, the main control module 53 gradually increases the driving current based on the feedback control until the actual moving speed of the arm 16 reaches $V_{ref}$. For example only, the feedback control may be performed by using proportional-plus-integral (PI) control, proportional-integral-derivative (PID) control, or phase lead-lag compensation control.

In one implementation, the main control module 53 starts the feedback control using $V_{ref}$ as the initial value when an initial value $I_{VM}$ is not designated. When the initial value $I_{VM}$ for the load control is designated, the main control module 53 does not start the feedback control using $V_{err}$. Instead, the main control module 53 outputs the initial value $I_{VM}$ and then starts the feedback control. Additionally, the main control module 53 loads in advance the previous input sequences of filters of the estimating module 71.

The correcting module 55 comprises an adder that adds the estimated external force $\hat{W}$ to $U_M$ and outputs U. The DAC module 57 converts U into the driving current. The driving section 20 receives the driving current and moves the arm 16 at the moving speed Y(V). The ADC module 63 converts the BEMF generated by the VCM of the driving section 20, amplifies the BEMF by an appropriate gain, and outputs the amplified BEMF to the estimating module 71 and adding module 51.

The estimating module 71 includes a first filter 65, a second filter 67, and an adding module 59. The first filter 65 receives a sequence of U, and outputs a sequence of a first filtered output based on $\hat{W}$ and U. The second filter 67 receives a sequence of Y(V) measured by the driving section 20, and outputs a sequence of a second filtered output based on $\hat{W}$ and Y(V). The estimating module 71 outputs a sum of the first and second filtered outputs to the correcting module 73. The correcting module 73 generates U by subtracting the sum from $U_M$.

When the arm 16 moves, the arm 16 is generally influenced by the external force W that comprises various stresses. The stresses may include, for example, the attractive force of the magnetic latch 34, the contact resistance of the claws of the inertia latch 42, the sliding resistance between the tab 46 and the ramp portion 26, the elastic reaction force of the connecting wire 24 against the arm 16, and the frictional resistance of the axis 18 against rotation. The estimating module 71 estimates the external force and generates $\hat{W}$ based on U and Y(V).

The first filter 65 has a transfer function $G_{uw}$. The first filter 65 filters U and outputs a manipulated variable $\hat{W}_{uw}$, which is not influenced by the external force W. The second filter 67 has a transfer function $G_{yw}$. The second filter 67 filters Y(V) and outputs a manipulated variable $\hat{W}_{yw}$, which changes due to the influence of the external force W. The adding module 69 adds $\hat{W}_{yw}$ and $\hat{W}_{uw}$ to generate $\hat{W}$. In practice, the adding module 69 subtracts the manipulated variable $\hat{W}_{yw}$ from the manipulated variable $\hat{W}_{uw}$ to obtain a difference (variation) between $\hat{W}_{yw}$ and $\hat{W}_{uw}$. The difference may be caused by the external force W and is output as $\hat{W}$.

The initial value memory 81 stores the initial value $I_{VM}$ for the main control module 53, an initial value $I_{V1}$ for the first filter 65 of the estimating module 71, and an initial value $I_{V2}$ for the second filter 67. The initial values $I_{VM}$, $I_{V1}$, and $I_{V2}$ may be used when the loading is performed. When the initial values $I_{V1}$ and $I_{V2}$ for the load control are designated, the first and second filters 65, 67 initially output the initial values $I_{V1}$ and $I_{V2}$, respectively, before the feedback control begins.

The operation of the estimating module 71 will now described mathematically. It is assumed that the plant model is a rigid body and the external force is a DC component. However, the present disclosure is not limited as such. For example, mechanical resonance or dynamics may be alternatively utilized as the external force.

A continuous time system model of the input manipulated variable to be controlled may be expressed by the following state equation:

$$\frac{d}{dt}\begin{Bmatrix} v \\ w \end{Bmatrix} = \begin{bmatrix} 0 & k_v \\ 0 & 0 \end{bmatrix}\begin{Bmatrix} v \\ w \end{Bmatrix} + \begin{Bmatrix} k_v \\ 0 \end{Bmatrix}u \qquad \text{Equation 1}$$

where v is the loading speed, w is the external force, u is the input manipulated variable, and $k_v$ is a conversion constant (gain).

The continuous time system model of the output speed to be controlled may be expressed by the following output equation:

$$y = [k_{bemf} \quad 0]\begin{Bmatrix} v \\ w \end{Bmatrix} \qquad \text{Equation 2}$$

where y is the output speed and $k_{bemf}$ is a conversion constant.

Based on the continuous time system models of the input manipulated variable and output speed, discrete time system models may be obtained as follows. The state equation and output equation may be expressed by equations 3 and 4, respectively.

$$X[k+1] = \begin{bmatrix} \Phi & \Gamma_1 \\ 0 & 0 \end{bmatrix}X[k] + \begin{bmatrix} \Gamma_2 \\ 1 \end{bmatrix}U[k] \qquad \text{Equation 3}$$

$$Y[k] = [k_{BEMF} \quad 0 \quad 0]X[K] \qquad \text{Equation 4}$$

where X is the state variable, Y is the output speed, k is an integer, U is the input manipulated variable, $\phi$ is a conversion constant (a matrix of two columns and two rows), $\Gamma_1$ and $\Gamma_2$ are conversion constants (a matrix of two columns and one row), O is a conversion constant (a matrix of one column and two rows), and $k_{BEMF}$ is a conversion constant. The $k^{th}$ state variable X[k] may be expressed by the following equation:

$$X[k] = [V[k]W[k]U[k-1]]^T \qquad \text{Equation 5}$$

where V is the loading speed, W is the external force, and T is the sampling period.

A method for estimating a current external force can be mathematically described as follows. Initially, X on the left side of the equation 3 is assumed to be a provisional value of the state variable ($\overline{X}$), and X on the right side is assumed to be a value of the state variable ($\hat{X}$), which is estimated to be the final target. Then, equation 6 can be obtained as follows:

$$\overline{X}[k+1] = \begin{bmatrix} \Phi & \Gamma_1 \\ 0 & 0 \end{bmatrix}\hat{X}[k] + \begin{bmatrix} \Gamma_2 \\ 1 \end{bmatrix}U[k] \qquad \text{Equation 6}$$

The state equation of the final value of the state variable $\hat{X}[k]$ can be expressed by equation 7, and the output equation of the final value of the output speed $\hat{Y}[k]$ can be expressed by equation 8 as follows:

$$\hat{X}[k] = \overline{X}[k] + \begin{bmatrix} \ell_e \\ 0 \end{bmatrix} \{Y[k] - [k_{BEMF} \ 0 \ 0] \overline{X}[K]\} \quad \text{Equation 7}$$

$$\hat{Y}[k] = [0 \ 1 \ 0] \hat{X}[K] \quad \text{Equation 8}$$

where X is the state variable, $\overline{X}$ is the provisional state variable, $\hat{X}$ is the final state variable, Y is the output speed, k is an integer, U is the input manipulated variable, φ is the conversion constant (a matrix of two columns and two rows), $\Gamma_1$ and $\Gamma_2$ are the conversion constants (a matrix of two columns and one row), O is the conversion constant (a matrix of one column and two rows), $k_{BEMF}$ is the conversion constant, and $1_e$ is the observer gain (a matrix of two columns and one row). The final value of the $k^{th}$ state variable $\hat{X}[k]$ can be expressed by the following equation:

$$\hat{X}[k] = [\hat{V}[k] \hat{W}[k] U[k-1]]^T \quad \text{Equation 9}$$

where $\hat{V}$ is the final loading speed, $\hat{W}$ is the final external force, and T is the sampling rate.

The final external force $\hat{W}$ can be expressed by using the transfer function $G_{uw}$, of the first filter 65, the transfer function $G_{yw}$ of the second filter 67, the input manipulated variable u, and the output speed y by the following equation:

$$\hat{W} = G_{uw} u + G_{yw} y \quad \text{Equation 10}$$

Figure 3A:
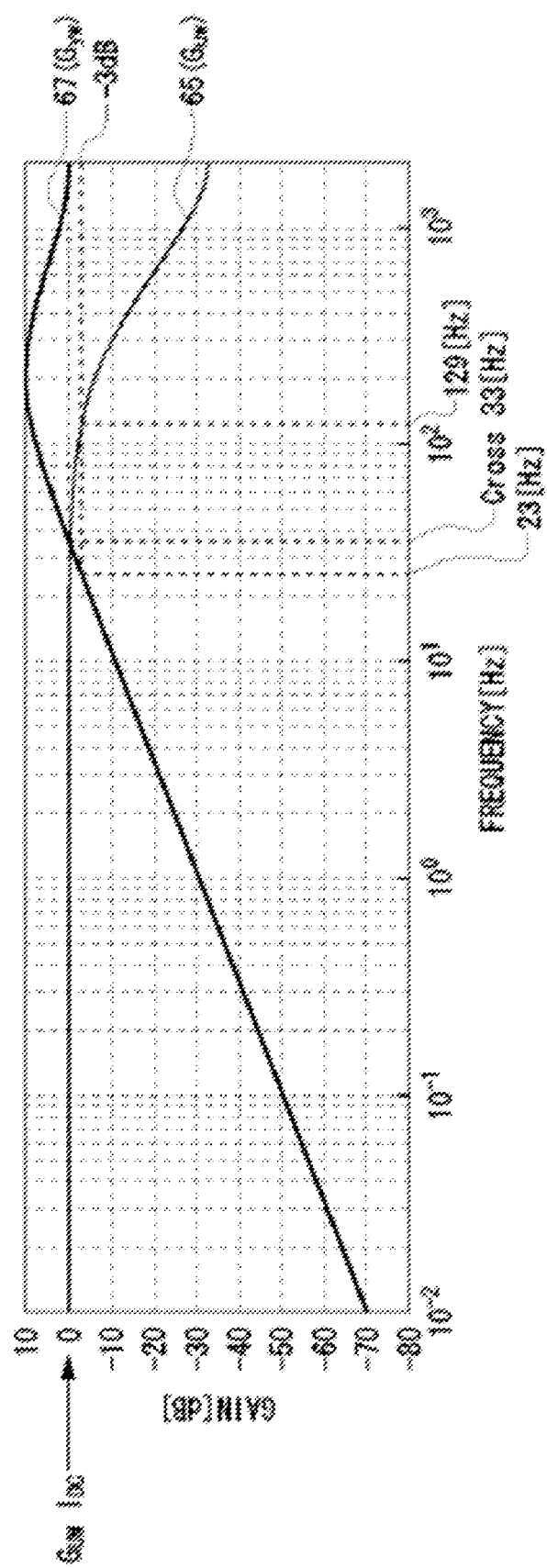
FIG. 3A is a Bode diagram showing a transfer function (gain) of an estimating module according to one implementation of the present disclosure.

Referring now to FIGS. 3A-5B, exemplary Bode diagrams of various transfer functions are shown. FIG. 3A is a Bode diagram of a transfer function (gain) of the estimating module 71. FIG. 3B is a Bode diagram of a transfer function (phase) of the estimating module 71. In FIG. 3A, an upper portion shows gain relative to frequency in the complex plane. The gain indicates a complex number representation of the magnitude of the transfer function. In FIG. 3B, a lower portion shows phase relative to frequency in the complex plane. The phase indicates the complex number representation of the angle of the transfer function. Other Bode diagrams follow this format.

In FIG. 3A, the gain of the transfer function $G_{uw}$ of the first filter 65 has a value of −3 dB at 129 Hz. The gain of the transfer function $G_{uw}$ is 0 dB before the gain decreases to −3 dB. At a frequency of 130 Hz or higher, the gain of the transfer function $G_{uw}$ further decreases. The gain of the transfer function $G_{yw}$ of the second filter 67 generally increases until a frequency of approximately 130 Hz, at which the gain of the transfer function $G_{yw}$ does not increase further. At a frequency of 200 Hz or higher, the gain of the transfer function $G_{yw}$ decreases. Accordingly, the transfer functions $G_{uw}$ and $G_{yw}$ indicate that the estimating module 71 can estimate an external force when at a frequency of approximately 130 Hz or lower.

Figure 3B:
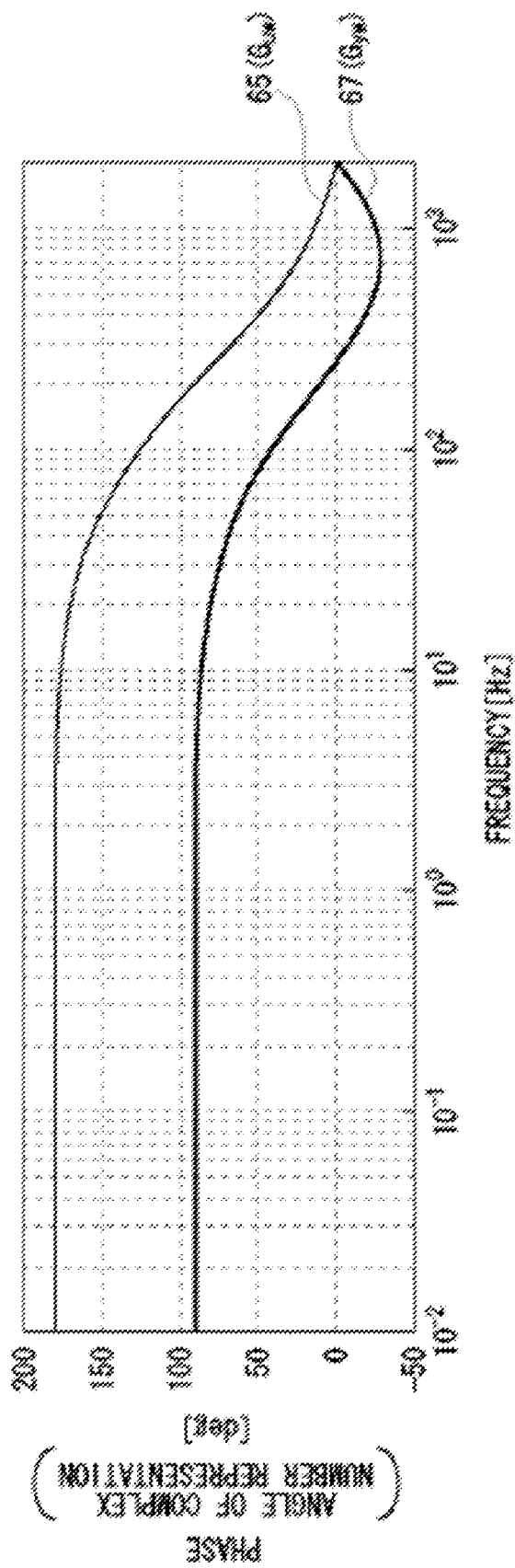
FIG. 3B is a Bode diagram showing a transfer function (phase) of the estimating module according to one implementation of the present disclosure.

In FIG. 3B, the phase of the transfer function $G_{uw}$ is approximately 180 degrees until the frequency reaches approximately 5 Hz. At a frequency of 5 Hz or higher, the angle decreases to 0 degrees. The phase of the transfer function $G_{yw}$ is approximately 90 degrees until the frequency reaches approximately 5 Hz. At a frequency of 5 Hz or higher, the angle decreases, and at a frequency of 200 Hz or higher, the angle becomes 0 degrees or less. However, when the frequency reaches around 700 Hz, the angle starts to increase towards 0 degrees.

Figure 4A:
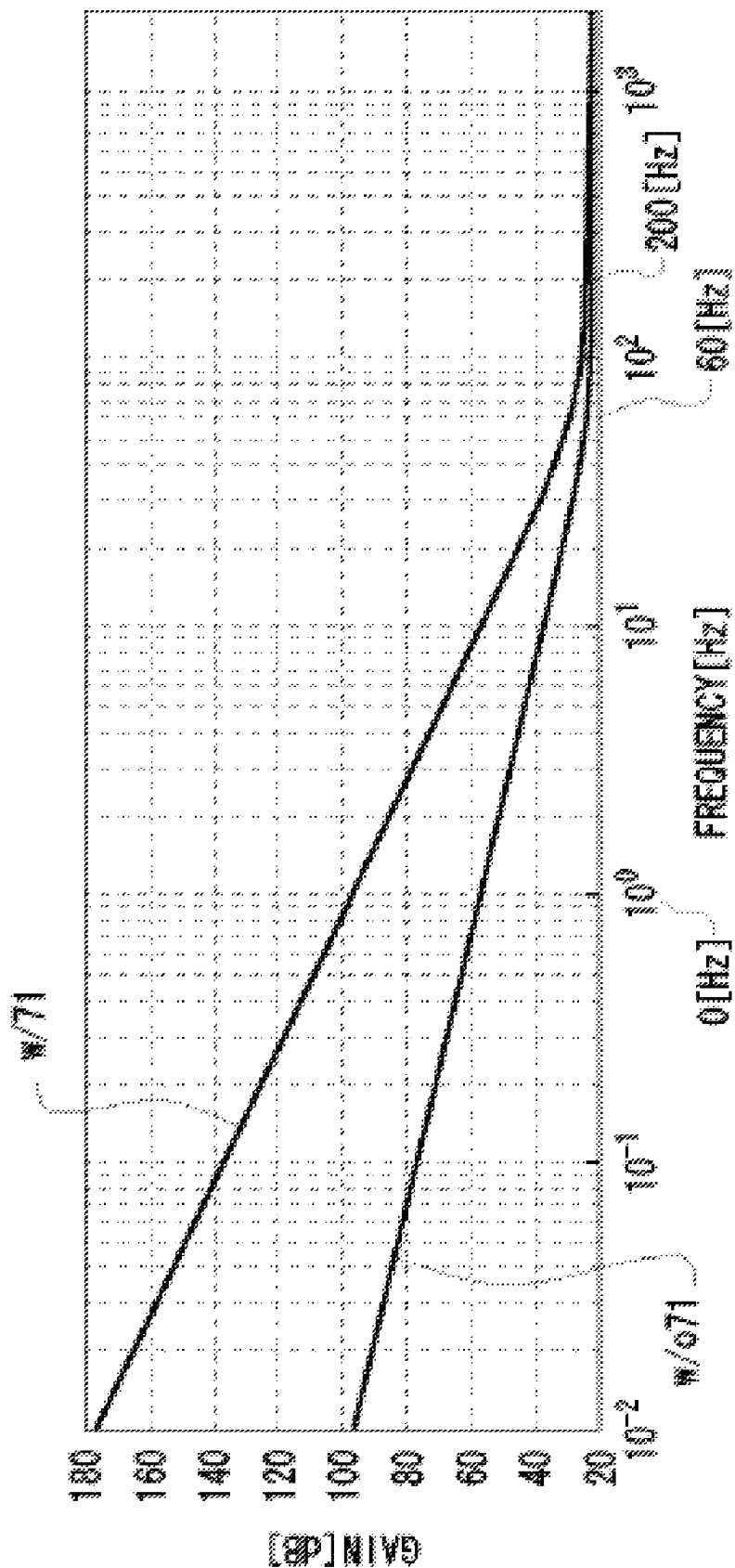
FIG. 4A is a Bode diagram showing a transfer function $C_M$ (gain) of a main control module according to one implementation of the present disclosure.
Figure 4B:
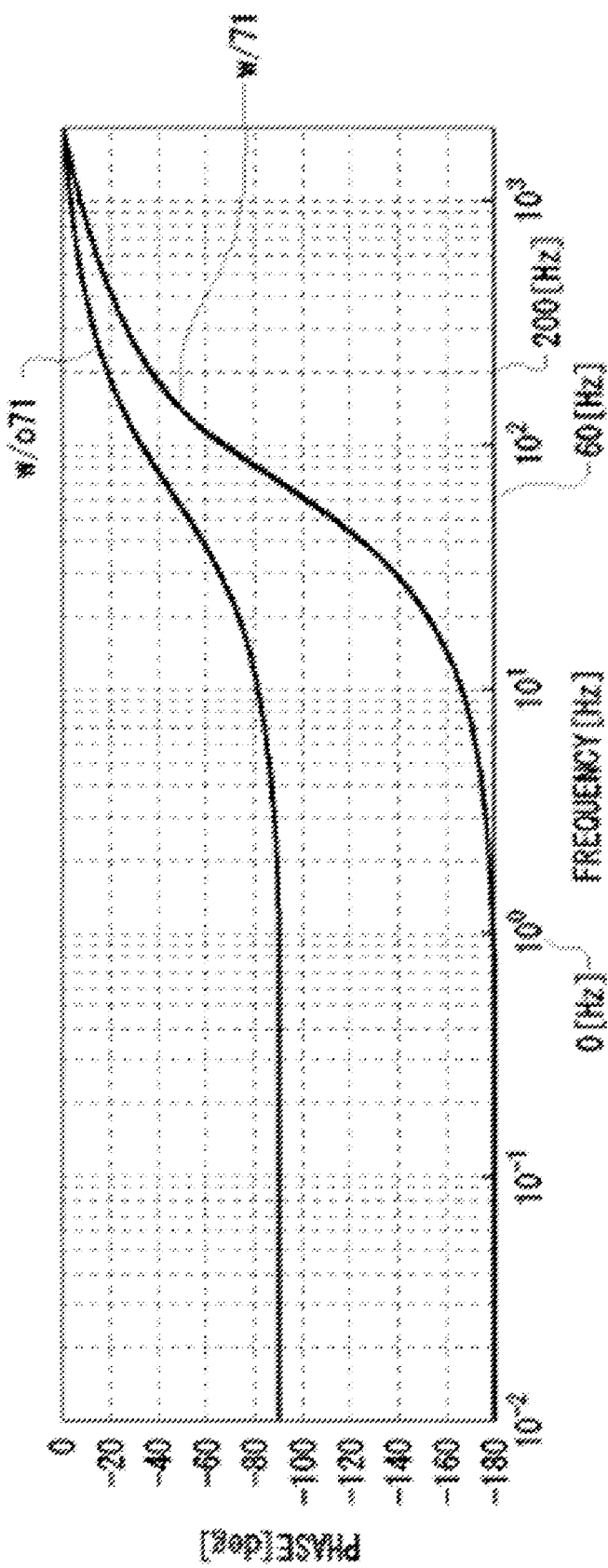
FIG. 4B is a Bode diagram showing a transfer function $C_M$ (phase) of the main control module according to one implementation of the present disclosure.

In FIG. 4A, a Bode diagram of a transfer function $C_M$ (gain) of the main control module 53 is shown. In FIG. 4B, a Bode diagram of a transfer function $C_M$ (phase) of the main control module 53 is shown. In FIG. 4A, an upper portion shows gain relative to frequency in the complex plane. In FIG. 4B, a lower portion shows phase relative to frequency in the complex plane. FIGS. 4A and 4B show exemplary results obtained when the main control module 53 is set such that the pole is 0 Hz, the zero is 60 Hz, and a zero-crossing frequency is 200 Hz.

In FIG. 4A, at a frequency of 100 Hz or lower, the gain of the transfer function $C_M$ is higher when the estimating module 71 is used than when the estimating module 71 is not used. The transfer function $C_M$ is generally expressed by the following equation.

$$\frac{V_{err}}{V_{ref}} = \frac{1}{1 + C_M \cdot P} \quad \text{Equation 11}$$

As the gain of the transfer function $C_M$ increases, the speed error $V_{err}$ decreases. Accordingly, when the estimating module 71 is included in the control module 22, the value of the denominator is higher, and $V_{err}$ is relatively lower. In other words, the estimating module 71 improves the performance of the servo control.

In FIG. 4B, the phase of the transfer function $C_M$ with and without the estimating module 71 is shown. Without the estimating module 71 (lower curve), the phase of $C_M$ is −90 degrees until the frequency reaches approximately 2 Hz. At a frequency of 2 Hz or higher, the angle increases towards 0 degrees. When the estimating module 71 is used (upper curve), the phase of $C_M$ is −180 degrees until the frequency reaches approximately 2 Hz. At a frequency of 2 Hz or higher, the angle increases towards 0 degrees. Thus, with the estimating module 71, the gain increases, but the phase is degraded.

Figure 5A:
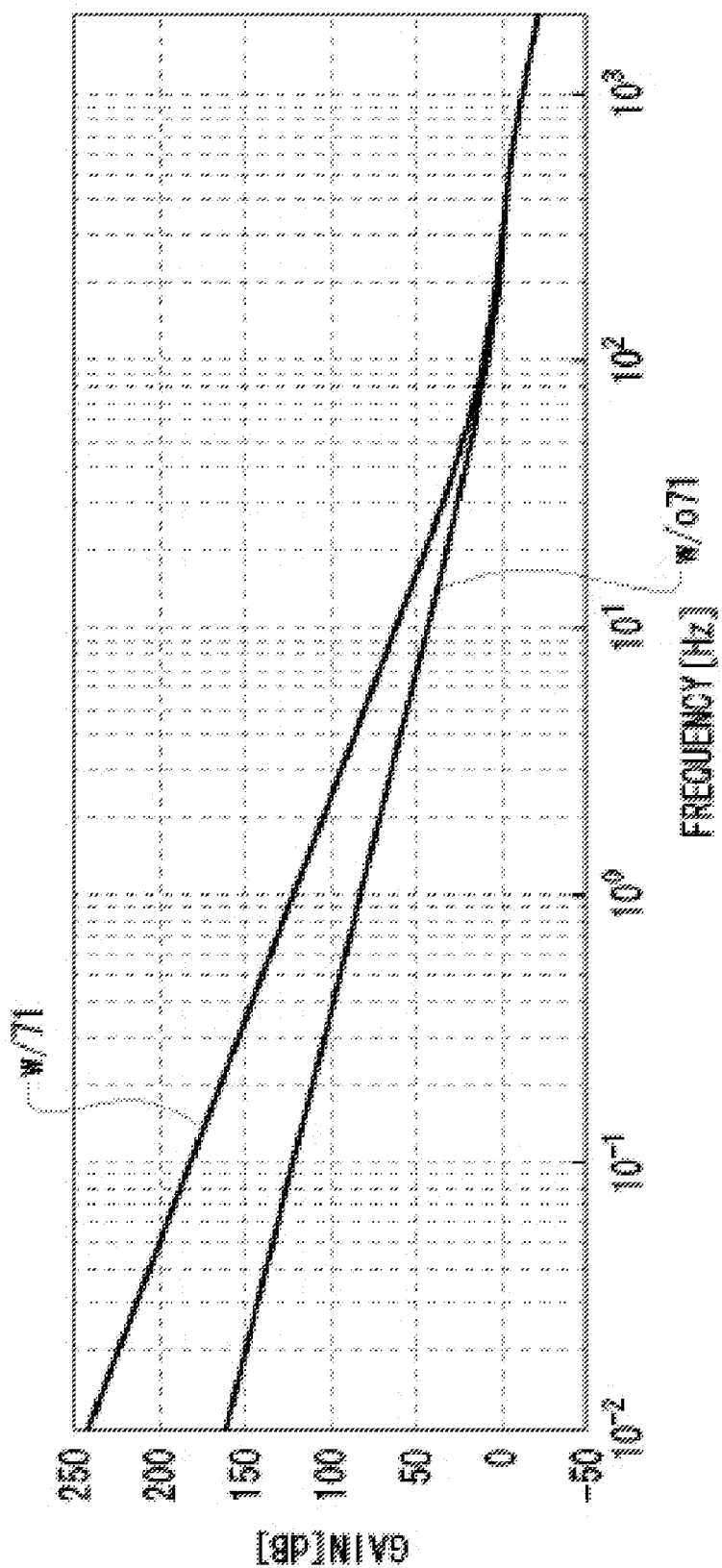
FIG. 5A shows an open-loop characteristic (gain) according to one implementation of the present disclosure.
Figure 5B:
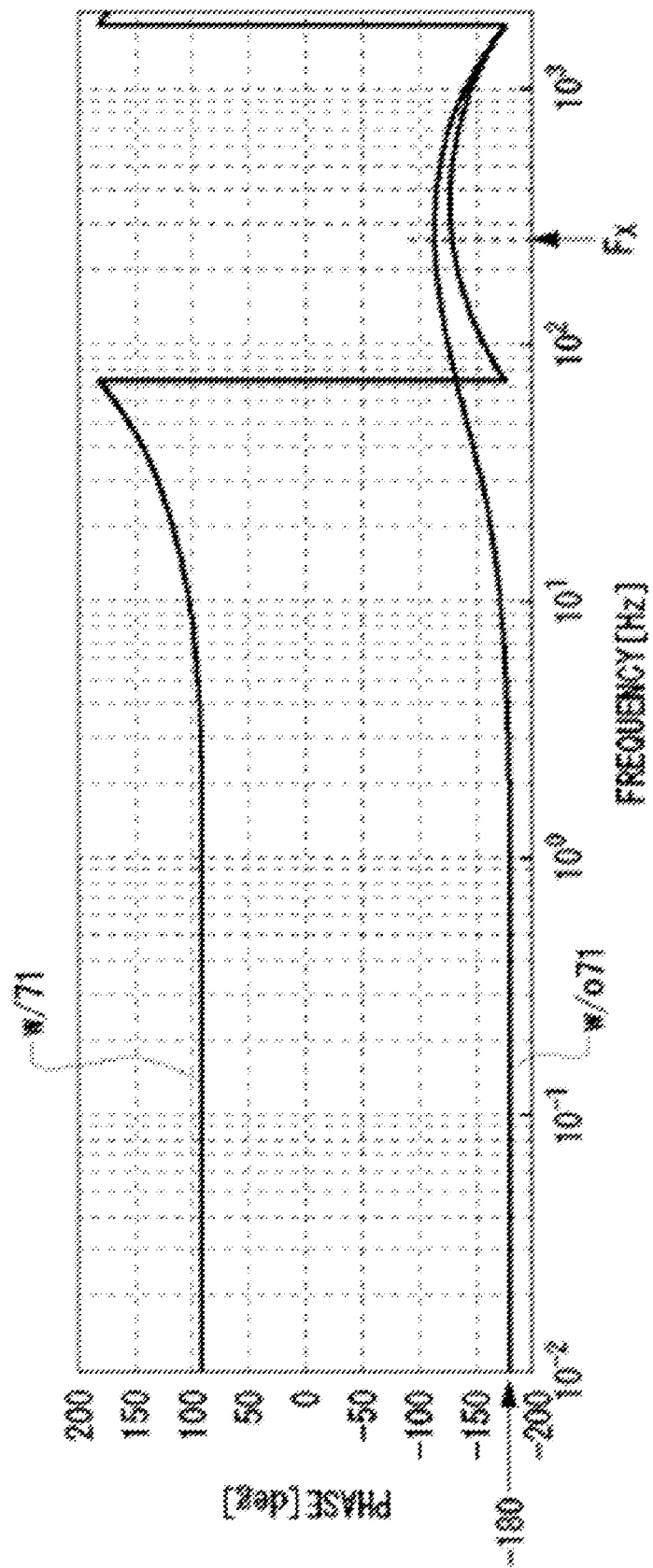
FIG. 5B shows an open-loop characteristic (phase) according to one implementation of the present disclosure.

In FIGS. 5A and 5B, Bode diagrams that compare the open-loop characteristic of the main control module 53 when the estimating module 71 is used and not used are shown, respectively. When the estimating module 71 is used, as an example, the zero-crossing frequency is 251 Hz, the gain margin is 20.9 dB, and the phase margin is 48.4 degrees.

As shown in FIG. 5B, the phase is approximately −180 degrees until the frequency reaches approximately 2 Hz. At a frequency of 2 Hz or higher, the angle slowly increases to approximately −130 degrees until the frequency reaches approximately 250 Hz. At frequencies from 250 Hz to approximately 1700 Hz, the angle degreases to approximately −180 degrees. When the frequency reaches approximately 1700 Hz, the angle increases to 180 degrees.

When the estimating module 71 is used, the phase is approximately 90 degrees until the frequency reaches approximately 2 Hz. At a frequency of 2 Hz or higher, the angle increases and reaches 180 degrees at the frequency of 70 Hz. When the frequency reaches 70 Hz, the angle decreases to −180 degrees. When the frequency increases from 70 Hz to approximately 350 Hz, the angle slowly increases to approximately −130 degrees. When the frequency increases from 350 Hz to approximately 1700 Hz, the angle decreases to approximately −180 degrees. At a frequency of 1700 Hz, the angle increases to 180 degrees.

As indicated by FIG. 5B, the phase is higher when the estimating module 71 is not used than when the estimating module 71 is used at the zero-crossing frequency Fx of 251 Hz. A stability margin is determined based on a margin between the phase at the zero-crossing frequency and −180 degrees. FIG. 5B indicates that the phase margin is smaller when the estimating module 71 is used. Thus, FIGS. 5A and 5B indicate that using the estimating module 71 can increase the gain while sacrificing the phase margin.

Unlike the control module 22, a conventional control modules control the loading of the arm 16 without using an estimating module or a correction module (e.g., estimating module 71 and correcting module 73). In conventional control modules, the initial values of the loading speed and acceleration are assumed to be zero when the loading begins. The DAC output U* of the DAC module 57 is measured when the head 14 overcomes the external force and starts to move. Subsequently, the initial values for the main control module 53 and estimating module 71 are calculated by using equations 12 to 15, respectively:

$$U_M = C_M \cdot V_{ref} \qquad \text{Equation 12}$$

$$\hat{W} = \hat{W}_{uw} = G_{uw} \cdot U_M = G_{uw} \cdot C_M \cdot V_{ref}(\because Y=0) \qquad \text{Equation 13}$$

where $U_M$ is the output of the main control module 53, $C_M$ is the transfer function of the main control module 53, $V_{ref}$ is the target speed, $\hat{W}$ is the final external force, $\hat{W}_{uw}$ is a component of the final external force that is dependent on U, and $G_{uw}$ is the transfer function of the first filter 65.

Using proportional distribution, we get $$U_M^* = \frac{1}{1 - G_{uw}|_{DC}} U^* \qquad \text{Equation 14}$$

$$\hat{W}_{uw}^* = \frac{G_{uw}|_{DC}}{1 - G_{uw}|_{DC}} U^* \qquad \text{Equation 15}$$

where $G_{uw}|DC$ is a direct current (DC) gain of the transfer function $G_{uw}$ of the first filter 65.

The initial values are set for the estimating module 71 and main control module 53 using the following equations:

$$\hat{W}_{uw}[-N] = \hat{W}_{uw}[-(N-1)] = \ldots = \hat{W}_{uw}[0] = \hat{W}_{uw}^* \qquad \text{Equation 16}$$

$$U_M[-N] = U_M[-(N-1)] = \ldots = U_M[0] = U_M^* \qquad \text{Equation 17}$$

$$\hat{W}_{yw}[-N] = \hat{W}_{yw}[-(N-1)] = \ldots = \hat{W}_{yw}[0] = 0 \qquad \text{Equation 18}$$

where N is a positive integer and –N indicates the $N^{th}$ previous value obtained by the sampling. For example, (in one implementation) when the first filter 65 and second filter 67 each comprise infinite impulse response (IIR) filters of $P^{th}$ order, the first to $P^{th}$ previous values obtained by sampling are used as the initial value, where P is an integer greater than 1.

When loading (or load control) begins, the main control module 53 and the first filter 65 use the initial value $U_M^*$ of the manipulated variable $U_M$. $U_M^*$ is obtained by performing a proportional distribution on the value of $U_M$ that is sufficient to load the head 14. The first filter 65 outputs an initial value $\hat{W}_{uw}^*$, and the second filter 67 outputs zero as an initial value $\hat{W}_{uw}^*$.

More specifically, (in one implementation) the first filter 65 generates an output $\hat{W}_{uw}$ based on the following values: predetermined number of values of $U_M$ that have been supplied to the driving section 20, value of $U_M$ that is to be newly supplied to the driving section 20, and predetermined number of values of $\hat{W}_{uw}$ that the first filter 65 has previously output. The initial value of the output $\hat{W}_{uw}$ (i.e., $\hat{W}_{uw}^*$) of the first filter 65 is equal to the product of $U_M^*$ and the DC component of the transfer function $G_{uw}$ of the first filter 65.

The number of previous values used as initial values by the first filter 65 depends on the order of the filter. For example, $\hat{W}_{uw}[-1]$ is a value of the manipulated variable that is obtained from an $(N-1)^{th}$ load control sample, $\hat{W}_{uw}[-2]$ is a value of the manipulated variable obtained from a $(N-2)^{th}$ sample, and so on, where $N^{th}$ sample is the current sample. The samples are taken when the head 14 actually starts moving and is not yet influenced by the external force W. The first filter 65 uses $\hat{W}_{uw}[-1], \hat{W}_{uw}[-2], \ldots,$ and $\hat{W}_{uw}[-P]$, as the initial values $I_{V1}$, where P is the order of the first filter 65.

When the second filter 67 is of the order P, the second filter 67 uses $\hat{W}_{yw}[-1], \hat{W}_{yw}[-2], \ldots,$ and $\hat{W}_{yw}[-P]$, as the initial values $I_{V2}$, wherein samples are taken when the head 14 actually starts moving and has been influenced by the external force W. The order of the filters determines the number of previous values of $U_M$ that are used as the initial value $U_M^*$ of the manipulated variable $U_M$. For example, when the first and second filters 65, 67 are of the order P, $U_M[-1], U_M[-2], \ldots,$ and $U_M[-P]$ are used as the initial value $I_{VM}$, wherein samples are taken when the head 14 actually starts moving.

In one implementation, the values $I_{V1}, I_{V2}$ and $I_{VM}$ are determined by designating, in advance, the order or coefficients of each filter. When the initial values $I_{V1}, I_{V2}$ and $I_{VM}$ are set, the first and second filters 65, 67 and the main control module 53 use the initial values $I_{V1}, I_{V2}$ and $I_{VM}$ instead of using the U, Y(V), and $V_{err}$, respectively.

Referring now to FIGS. 6A and 6B, effects on $V_L$ and $DAC_{out}$ of not using and using the estimating module 71, correcting module 73, and initial value memory 81 are shown, respectively. As an example, the number of samples obtained with the sampling interval $T_S$ set at 263 μs is plotted along the horizontal axis. $V_L$ (i.e., the speed Y(V) of FIG. 2) and $DAC_{out}$ are plotted along the vertical axis. $V_T$ indicates the target speed Vref of FIG. 2.

In FIG. 6A, a sample region A1 shows load control when the released head 14 is being attracted by the magnet 30. When the load control begins, $V_L$ is zero. $V_L$ gradually increases and stops increasing after reaching approximately 3-5. During this period, the head 14 may not move towards the outer edge of the storage medium 12. The detected speed includes measurement errors due to the change in resistance caused by the heating of the coil. During this period, since the load control is initiated with no initial values, the head 14 does not move. This period lasts until the driving current increases to a level at which the head 14 is released from the magnetic latch 34.

Once the head 14 starts moving, $V_L$ drops to approximately $V_T$. As the distance between the magnetic material 28 and magnet 30 increases, the attractive force of the magnet gradually decreases. $V_L$ decreases relatively slowly from approximately $V_T$. $V_L$ continues to decrease slowly after the sample region A1 ends. During this period, $DAC_{out}$ gradually increases from the initial value to slightly above 100 and stops increasing after reaching approximately 740 to 760. $DAC_{out}$ keeps increasing and decreasing after the sample region A1 ends until the number of samples reaches approximately 120 to 140. Then $DAC_{out}$ starts decreasing. As the head 14 moves, the attractive force of the magnet 30 gradually decreases. The driving current is decreased through the feedback control so that $V_L$ approaches $V_T$. Accordingly, $V_L$ is lower than $V_T$ during this period.

In a sample region A2, the head 14 is further released from the contact resistance between the claws 38 and 40 of the inertia latch 42. $V_L$ gradually decreases to approximately –10 when the number of samples is in approximately 220 to 240. Then $V_L$ increases and peaks at approximately 3-5. Then $V_L$ decreases to approximately $V_T$ and decreases very slowly thereafter. Concurrently, $DAC_{out}$ decreases, increases, and then decreases. The last decrease of the output value $DAC_{out}$ is slow.

In a sample region A3, the head 14 is released from the ramp portion 26 and moved so as to be positioned over the storage medium 12. $V_L$ drops to approximately −20 when the number of samples is approximately 960-980. Then $V_L$ increases to approximately $V_T$ and holds steady. Concurrently, $DAC_{out}$ decreases, increases relatively slowly, reaches 10 (e.g., slightly above 0), and holds steady.

In FIG. 6B, in sample region A1a, $V_L$ is initially zero when the control begins. Then $V_L$ drops to approximately $V_T$. As the head 14 moves, $V_L$ slowly decreases. After the sample region A1a ends, $V_L$ continues to decrease slowly. Concurrently, $DAC_{out}$ decreases to 700 from the initial value of approximately 800 to 900. Then $DAC_{out}$ increases slightly and then decreases relatively slowly.

In a sample region A2a, $V_L$ gradually decreases to approximately −4 to −5 when the number of samples is approximately 180 to 190. Then $V_L$ increases to peak at approximately 0. Then $V_L$ drops to approximately $V_T$ and holds steady. Concurrently, $DAC_{out}$ decreases, increases, and then decreases. The last decrease of $DAC_{out}$ is slow.

In a sample region A3a, $V_L$ drops approximately −14 to −16 when the number of samples is approximately 960 to 980. Then $V_L$ increases to approximately $V_T$ and holds steady. Concurrently, $DAC_{out}$ decreases, increases relatively slowly, reaches 10 (i.e., slightly above 0), and holds steady.

As can be appreciated, the teachings of the present disclosure reduce the influence of the magnetic force of the magnetic latch 34 and the contact resistance of the inertia latch 42 when the head 14 is released from the ramp portion 26 at the start of the load control. Consequently, the variation in $V_L$ is reduced, and the time taken by $V_L$ to reach $V_T$ is decreased.

Referring now to FIGS. 7A to 7C, the effects of setting initial values for the estimating module 71 and/or main control module 53 on $V_L$ and driving current are shown. In FIG. 7A, the initial values are set only for the estimating module 71. In FIG. 7B, the initial value is set only for the main control module 53. In FIG. 7C, the initial values are set for the estimating module 71 and main control module 53.

In FIG. 7A, $V_L$ has a value slightly below 0 when the control is initiated in a sample region A1b. Then $V_L$ increases, peaks at approximately 15, and then decreases. During this time, the head 14 does not move. This period lasts until the driving current increases to a level at which the head 14 is released from the magnetic latch 34 after the load control is initiated. During this period, in practice, the head does not move towards the outer edge of the storage medium 12. The detected speed includes measurement errors due to the change in resistance value caused by the heating of the coil. Concurrently, $DAC_{out}$ gradually increases from the initial value of slightly above 600, stops increasing at approximately 740 to 760, and keeps increasing and decreasing.

When the head 14 starts moving, $V_L$ decreases to approximately $V_T$. As the distance between the magnetic material 28 and magnet 30 increases, the attractive force of the magnet gradually decreases. $V_L$ decreases relatively slowly. After the sample region A1b ends, $V_L$ continues to decrease slowly. After the sample region A1b ends, $DAC_{out}$ decreases until the number of samples reaches approximately 120.

In a sample region A2b, the head 14 is further released from the contact resistance between the claws 38 and 40. $V_L$ gradually decreases to approximately −8 when the number of samples is approximately 120. Then $V_L$ increases, peaks at approximately 7 to 8, decreases, reaches approximately $V_T$, and holds steady. Concurrently, $DAC_{out}$ decreases, increases, and then decreases. The last decrease of $DAC_{out}$ is slow.

Accordingly, when the initial values are set only for the estimating module 71, the head 14 does not move within the time period during which the head 14 is released from the magnetic latch 34 at the start of the load control. In addition, the variation in $V_L$ is not reduced during the time period in which the head 14 is released from the influence of the contact resistance of the inertia latch 42.

In FIG. 7B, $V_L$ has a value slightly below 0 when the control is initiated in a sample region A1c. Then $V_L$ decreases to approximately −36, increases to approximately $V_T$, and holds steady. During the initial decrease in $V_L$, the head 14 is released from the magnetic latch 34 since the driving current is set to a high initial value. During this period, $DAC_{out}$ increases to 1024 or higher, decreases to approximately 700, and then increases and decreases around this level multiple times.

Accordingly, when the initial value is set only for the main control module 53, the head 14 is released from the magnetic latch 34 with a high driving current at the beginning of the control. This causes $V_L$ to overshoot, which may increase backlash. Thus, the variation in $V_L$ is not reduced when the initial value is set only for the main control module 53.

In FIG. 7C, $V_L$ has a value slightly below 0 when the control is initiated in a sample region A1d. Then $V_L$ decreases to approximately −7 to −8, increases to approximately $V_T$, and stays there. The time taken by $V_L$ to reach $V_T$ in the sample region A1d is approximately halved relative to the sample regions A1b and A1c. Accordingly, when the initial values are set for both of the estimating module 71 and main control module 53, the variation in the head moving speed is reduced, and the time taken by $V_L$ to reach $V_T$ is decreased.

At the start of loading (or load control), the estimating module 71 generates the initial value of the estimated external force $\hat{W}^*$ based on the manipulated variable $U_M$ and moving speed Y(V). $\hat{W}^*$ at Y(V)=0 is greater than $\hat{W}$ when Y(V) changes from zero to a value sufficient for loading. $\hat{W}^*$ is input to the correcting module 73. The main control module 53 generates the manipulated variable U when Y(V) changes from zero to a value sufficient for loading. U at Y(V)=0 is greater than $U_M$ and is input to the estimating module 71. By supplying higher initial values to the estimating module 71 and main control module 53, a smooth kick-off of the arm 16 is realized. The time taken to generate the kick-off can be decreased although initial values are not set greater than or equal to values that move the head 14.

Referring now to FIGS. 8 and 9, a flowchart for a method of loading the arm 16 according to one implementation of the present disclosure is shown. In FIG. 8, the control module 22 determines in step S1 whether the head 14 is to be driven depending on whether write or read commands are received. If the result of step S1 is false, the control module 22 repeats the step S1. If the result of step S1 is true, the control module 22 determines in step S2 whether the head 14 is parked in the ramp portion 26. If the result of step S2 is false, the control module 22 ends the loading operation. If the result of step S2 is true, the control module 22 reads sequences of the initial values $I_{VM}$, $I_{V1}$, $I_{V2}$ from the initial value memory 81 in step S3, and sets the read sequences as initial values of the main control module 53, the first filter 65, and the second filter 67, respectively.

In step S4, the control module 22 reads the target speed value $V_{ref}$ that is stored in the storage system 10 or read from an external device. The main control module 53 generates the manipulated variable $U_M(1)$ in step S5. The main control module 53 initially outputs the initial value of the manipulated variable when the initial value is designated.

The estimating module 71 receives the manipulated variable $U_M(1)$. Additionally, the estimating module 71 receives the speed Y(V)(0) detected by the driving section 20, wherein the driving section 20 is driven using the previous manipulated variable $U_M(0)$. Based on $U_M(1)$ and Y(V) (0), the estimating module 71 estimates the external force in step S6. Additionally, the control module 22 corrects the next manipulated variable $\hat{W}(2)$ with the estimated external force $\hat{W}$ and outputs the corrected manipulated variable U(2) in step S6. The estimating module 71 initially outputs the estimated external force $\hat{W}(1)$ based on the initial values when the initial values are set.

The DAC module 57 converts U(2) into an analog signal and outputs the analog signal (i.e., the driving current) to the driving section 20 in step S7. The driving section 20 drives the arm 16 (and the head 14) in step S8. The control module 22 detects the BEMF generated by the VCM of the driving section 20, and generates the moving speed (i.e., the detected speed) of the head 14 in step S9. The ADC module 63 converts the detected speed into a digital signal and outputs the digital signal to the estimating module 71 and adding module 51 in step S10. The estimating module 71 estimates the external force based on the detected speed in the step S6. The adding module 51 subtracts the detected speed from $V_{ref}$, generates the speed error $V_{err}$, and outputs $V_{err}$ to the main control module 53 in step S11. The method repeats steps S5 through S11.

In FIG. 9, a flowchart shows step 6 of FIG. 8 in detail. The first filter 65 having the transfer function $G_{uw}$, processes the corrected manipulated variable U in step S21 and generates the estimated external force $\hat{W}_{uw}$ based on the estimated external force $\hat{W}$ and U. The second filter 67 having the transfer function $G_{yw}$ processes the detected speed in step S22 and generates the estimated external force $\hat{W}_{yw}$ based on the estimated external force $\hat{W}$ and the detected speed. The adding module 69 adds the estimated external forces $\hat{W}_{uw}$ and $\hat{W}_{yw}$ and generates the estimated external force $\hat{W}$ in step S23. The correcting module 73 adds the estimated external force $\hat{W}$ to the manipulated variable $U_M$ and generates the corrected manipulated variable U in step S24.

Additionally, when the temperature sensor 44 is provided, the main control module 53 and first filter 65 may vary the initial values $U_M^*$ of the manipulated variable $U_M$ and $\hat{W}_{uw}^*$ of the manipulated variable $\hat{W}_{uw}$ based on the temperature, respectively. $U_M^*$ and $\hat{W}_{uw}^*$ may be provided using a table. $U_M^*$ and $\hat{W}_{uw}^*$ may be provided with the value of $U_M$ that is sufficient to load the head 14 on the storage medium 12. The control module 22 may obtain $U_M$ based on a previously observed value of $U_M$ when the head 14 is loaded on the storage medium 12. Alternatively, the control module 22 may store an average value of $U_M$, the maximum value of $U_M$, the value of $U_M$ for each temperature, the maximum value of $U_M$ among previous few values, and so on. Additionally, the first and second filters 65, 67 may vary the transfer functions ($G_{uw}$ and $G_{yw}$) based on the temperature. The transfer functions ($G_{uw}$ and $G_{yw}$) may be provided using a table.

In some implementations, the control module 22 may comprise a microcomputer or a microcontroller that includes a program code for performing load control, speed control, and positioning control during seek operations. The program may be stored in the microcomputer or the microcontroller when the storage system 10 is manufactured. Alternatively, the program may be loaded into the microcomputer or the microcontroller by a computer that uses the storage system 10.

Referring now to FIG. 10, an exemplary computer 900 that uses the storage system 10 is shown. The computer 900 may comprise a central processing unit (CPU) 1000, read-only memory (ROM) 1010, random access memory (RAM) 1020, a host controller 1082, an input/output (I/O) controller 1084, an I/O module 1070, and a communication interface (I/F) 1030. The computer 900 may include a hard disk drive (HDD) 1040, a compact disc (CD) drive 1060, and a floppy disk (FD) drive 1050. Additionally, the computer 900 may include a graphic controller 1075 and a display device 1080.

In operation, the CPU 1000 may receive a boot code at startup from the ROM 1010 via the host controller 1082 and the I/O controller 1084. The CPU 1000 may execute programs stored on the HDD 1040 and may read/write data on the HDD 1040. The CPU 1000 may access RAM 1020 via the host controller 1082 and read/write data on RAM 1020 when executing programs. Additionally, the CPU 1000 may read/write data on a CD 1095 and a FD 1090 that are used with the CD drive 1060 and the FD drive 1050, respectively.

The CPU 1000 may communicate with the HDD 1040 and the CD drive 1060 via the host controller 1082 and the I/O controller 1084. The CPU 1000 may communicate with the FD drive 1050 via the host controller 1082, the I/O controller 1084, and the I/O module 1070. The CD drive 1060 may communicate with the HDD 1040 via the I/O controller 1084. The FD drive may communicate with the HDD 1040 and the CD drive 1060 via the I/O module 1070 and the I/O controller 1084. Accordingly, programs (e.g., updates) may be transferred from the CD drive 1060 and/or the FD drive 1050 to the HDD 1040. Additionally, the I/O module 1070 may connect the computer 900 to various I/O devices (e.g., keyboard, mouse, printer, tape drives, etc.) via serial/parallel ports and/or other suitable ports.

The graphic controller 1075 may communicate with the CPU 1000 and RAM 1020 via the host controller 1082 and may display data generated by the CPU 1000 on the display 1080. The computer 900 may communicate with other devices on a network via the communication I/F 1030. The communication I/F 1030 may communicate with the CPU 1000 via the I/O controller 1084 and the host controller 1082. Additionally, the communication I/F 1030 may communicate with the HDD 1040 via the I/O controller 1084. Accordingly, data (e.g., updates) received from other devices on the network may be transferred to the HDD 1040.

A program for controlling the loading and positioning of heads of the HDD 1040 may be supplied to the HDD 1040. The program may be stored on the FD 1090 or CD 1095 and may be read into RAM 1020. Additionally, the program may be received into RAM 1020 from other devices on the network via the communication I/F 1030. The program may be transferred from RAM 1020 to the HDD 1040 via the I/O controller 1084. A microcomputer or a microcontroller included in a control apparatus (e.g., the control module 22) of the HDD 1040 may execute the program to control the loading and positioning of the heads of the HDD 1040. The microcomputer or a microcontroller may implement the control module 22 when executing the program.

Figure 11B:
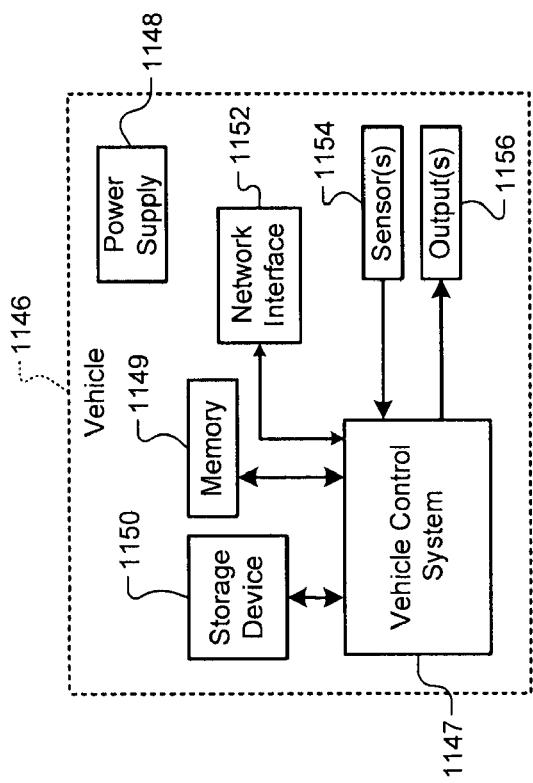
FIG. 11B is a functional block diagram of a vehicle control system according to one implementation of the present disclosure.
Figure 11A:
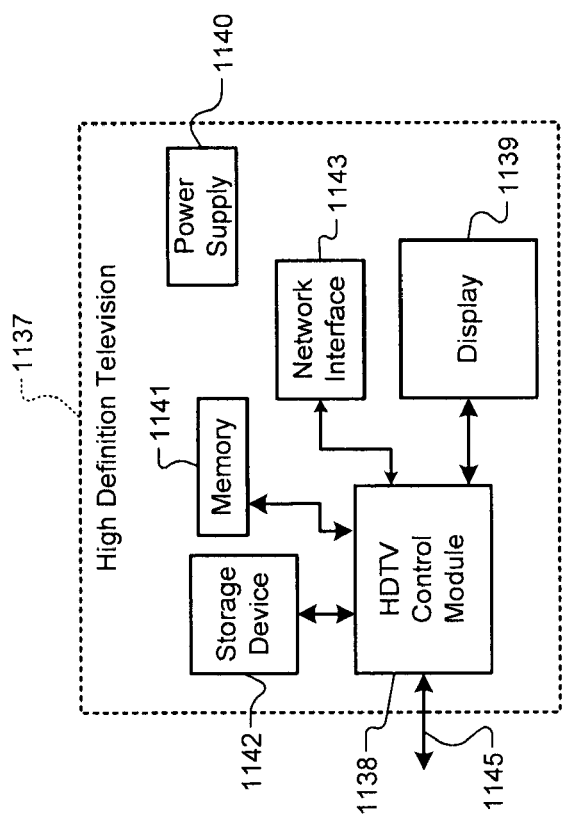
FIG. 11A is a functional block diagram of a high definition television according to one implementation of the present disclosure.

Referring now to FIGS. 11A-11E, various exemplary implementations incorporating the teachings of the present disclosure are shown. Referring now to FIG. 11A, the teachings of the disclosure can be implemented in a storage device 1142 of a high definition television (HDTV) 1137. The HDTV 1137 includes an HDTV control module 1138, a display 1139, a power supply 1140, memory 1141, the storage device 1142, a network interface 1143, and an external interface 1145. If the network interface 1143 includes a wireless local area network interface, an antenna (not shown) may be included.

The HDTV 1137 can receive input signals from the network interface 1143 and/or the external interface 1145, which can send and receive data via cable, broadband Internet, and/or satellite. The HDTV control module 1138 may process the input signals, including encoding, decoding, filtering, and/or formatting, and generate output signals. The output signals may be communicated to one or more of the display 1139, memory 1141, the storage device 1142, the network interface 1143, and the external interface 1145.

Memory 1141 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory (in which each memory cell has more than two states). The storage device 1142 may include an optical storage drive, such as a DVD drive, and/or a hard storage medium drive (HDD). The HDTV control module 1138 communicates externally via the network interface 1143 and/or the external interface 1145. The power supply 1140 provides power to the components of the HDTV 1137.

Referring now to FIG. 11B, the teachings of the disclosure may be implemented in a storage device 1150 of a vehicle 1146. The vehicle 1146 may include a vehicle control system 1147, a power supply 1148, memory 1149, the storage device 1150, and a network interface 1152. If the network interface 1152 includes a wireless local area network interface, an antenna (not shown) may be included. The vehicle control system 1147 may be a powertrain control system, a body control system, an entertainment control system, an anti-lock braking system (ABS), a navigation system, a telematics system, a lane departure system, an adaptive cruise control system, etc.

The vehicle control system 1147 may communicate with one or more sensors 1154 and generate one or more output signals 1156. The sensors 1154 may include temperature sensors, acceleration sensors, pressure sensors, rotational sensors, airflow sensors, etc. The output signals 1156 may control engine operating parameters, transmission operating parameters, suspension parameters, braking parameters, etc.

The power supply 1148 provides power to the components of the vehicle 1146. The vehicle control system 1147 may store data in memory 1149 and/or the storage device 1150. Memory 1149 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 1150 may include an optical storage drive, such as a DVD drive, and/or a hard storage medium drive (HDD). The vehicle control system 1147 may communicate externally using the network interface 1152.

Figure 11D:
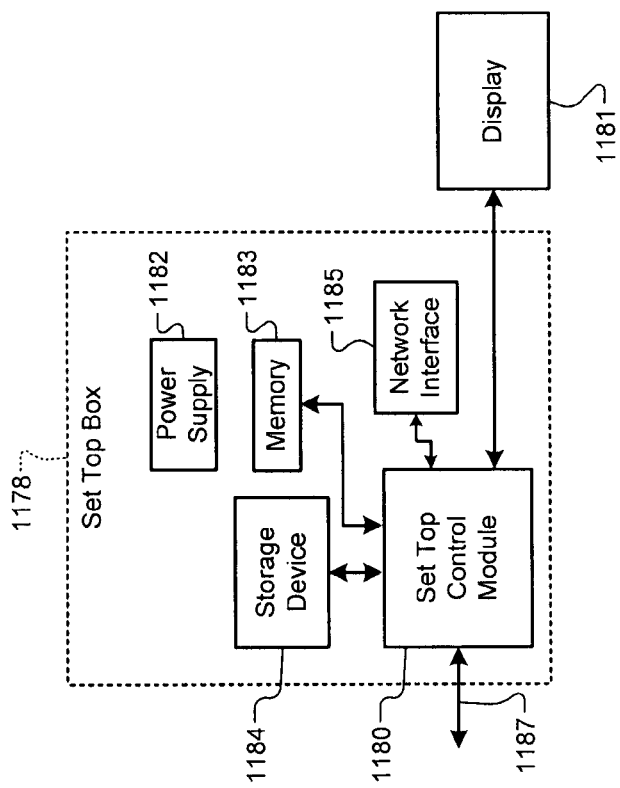
FIG. 11D is a functional block diagram of a set top box according to one implementation of the present disclosure.
Figure 11C:
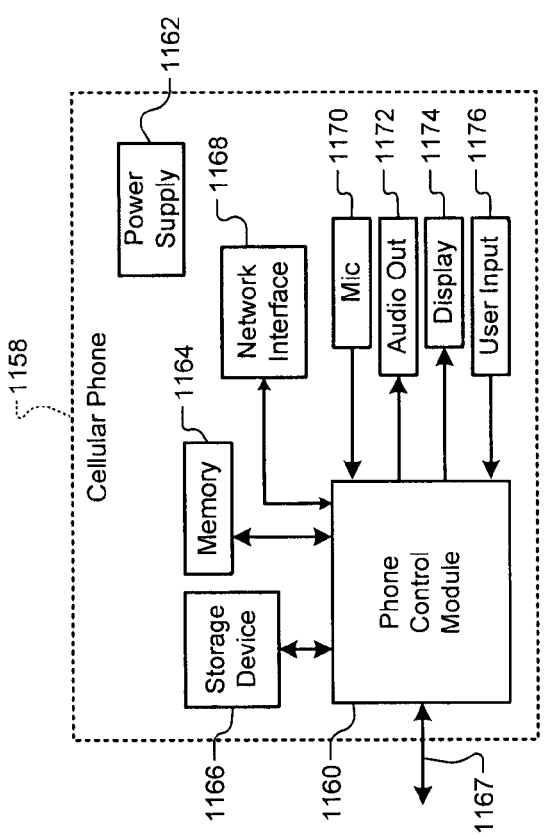
FIG. 11C is a functional block diagram of a cellular phone according to one implementation of the present disclosure.

Referring now to FIG. 11C, the teachings of the disclosure can be implemented in a storage device 1166 of a cellular phone 1158. In one implementation, the cellular phone 1158 includes a phone control module 1160, a power supply 1162, memory 1164, the storage device 1166, and a cellular network interface 1167. The cellular phone 1158 may include a network interface 1168, a microphone 1170, an audio output 1172 such as a speaker and/or output jack, a display 1174, and a user input device 1176 such as a keypad and/or pointing device. If the network interface 1168 includes a wireless local area network interface, an antenna (not shown) may be included.

The phone control module 1160 may receive input signals from the cellular network interface 1167, the network interface 1168, the microphone 1170, and/or the user input device 1176. The phone control module 1160 may process signals, including encoding, decoding, filtering, and/or formatting, and generate output signals. The output signals may be communicated to one or more of memory 1164, the storage device 1166, the cellular network interface 1167, the network interface 1168, and the audio output 1172.

Memory 1164 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory (in which each memory cell has more than two states). The storage device 1166 may include an optical storage drive, such as a DVD drive, and/or a hard storage medium drive (HDD). The power supply 1162 provides power to the components of the cellular phone 1158.

Referring now to FIG. 11D, the teachings of the disclosure can be implemented in a storage device 1184 of a set top box 1178. In one implementation, the set top box 1178 includes a set top control module 1180, a display 1181, a power supply 1182, memory 1183, the storage device 1184, and a network interface 1185. If the network interface 1185 includes a wireless local area network interface, an antenna (not shown) may be included.

The set top control module 1180 may receive input signals from the network interface 1185 and an external interface 1187, which can send and receive data via cable, broadband Internet, and/or satellite. The set top control module 1180 may process signals, including encoding, decoding, filtering, and/or formatting, and generate output signals. The output signals may include audio and/or video signals in standard and/or high definition formats. The output signals may be communicated to the network interface 1185 and/or to the display 1181. The display 1181 may include a television, a projector, and/or a monitor.

The power supply 1182 provides power to the components of the set top box 1178. Memory 1183 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory (in which each memory cell has more than two states). The storage device 1184 may include an optical storage drive, such as a DVD drive, and/or a hard storage medium drive (HDD).

Figure 11E:
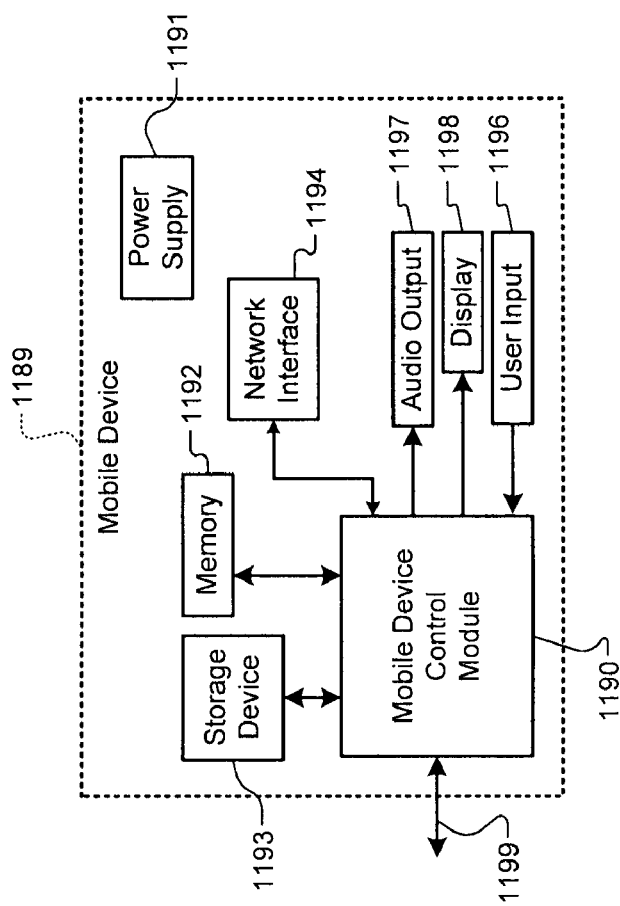
FIG. 11E is a functional block diagram of a mobile device according to one implementation of the present disclosure.

Referring now to FIG. 11E, the teachings of the disclosure can be implemented in a storage device 1193 of a mobile device 1189. The mobile device 1189 may include a mobile device control module 1190, a power supply 1191, memory 1192, the storage device 1193, a network interface 1194, and an external interface 1199. If the network interface 1194 includes a wireless local area network interface, an antenna (not shown) may be included.

The mobile device control module 1190 may receive input signals from the network interface 1194 and/or the external interface 1199. The external interface 1199 may include USB, infrared, and/or Ethernet. The input signals may include compressed audio and/or video, and may be compliant with the MP3 format. Additionally, the mobile device control module 1190 may receive input from a user input 1196 such as a keypad, touchpad, or individual buttons. The mobile device control module 1190 may process input signals, including encoding, decoding, filtering, and/or formatting, and generate output signals.

The mobile device control module 1190 may output audio signals to an audio output 1197 and video signals to a display 1198. The audio output 1197 may include a speaker and/or an output jack. The display 1198 may present a graphical user interface, which may include menus, icons, etc. The power supply 1191 provides power to the components of the mobile device 1189. Memory 1192 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory (in which each memory cell has more than two states). The storage device 1193 may include an optical storage drive, such as a DVD drive, and/or a hard storage medium drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
    a control module configured to generate a first signal to control a speed of an actuator arm of a rotating storage device; and
    an estimating module including
        a first filter configured to generate a first filtered output based on the first signal, and
        a second filter configured to generate a second filtered output based on the speed of the actuator arm,
    wherein the estimating module is configured to estimate a force to move the actuator arm based on (i) the first filtered output and (ii) the second filtered output, and
    wherein the first filter and the second filter include infinite impulse response (IIR) filters of $P^{th}$ order, where P is an integer greater than 1.

2. The system of claim 1, wherein the estimating module is configured to generate an estimated force signal based on (i) the first filtered output and (ii) the second filtered output, and wherein the estimated force signal is used to correct the first signal.

3. The system of claim 2, wherein when the actuator arm is in a parked position, the control module and the estimating module are configured to respectively generate the first signal and the estimated force signal based on a first input that moves the actuator arm from the parked position, and wherein the first input is based on a proportional distribution of a second input that loads the actuator arm on a storage medium of the rotating storage device.

4. The system of claim 3, wherein the first filtered output is based on (i) the first input and (ii) a direct current (DC) component of a transfer function of the first filter.

5. The system of claim 3, further comprising a temperature sensor configured to sense a temperature of the rotating storage device, wherein the first input and the first filtered output are based on the temperature, and wherein transfer functions of the first filter and the second filter are based on the temperature.

6. The system of claim 1, wherein the control module is configured to generate the first signal based on a difference between (i) the speed of the actuator arm and (ii) a target speed of the actuator arm.

7. The system of claim 1, wherein the first filter is configured to generate the first filtered output based on P samples of each of the first signal and the first filtered output, and wherein the P samples are taken in response to the actuator arm moving from a parked position.

8. The system of claim 1, wherein when the actuator arm is in a parked position, the first filter, the second filter, and the control module respectively receive a first input, a second input, and a third input, and wherein the first input, the second input, and the third input are based on coefficients of the first filter and the second filter.

9. The system of claim 8, wherein the first input, the second input, and the third input are based on P samples of the first filtered output, the second filtered output, and the first signal, respectively, wherein the P samples are taken in response to the actuator arm moving from the parked position.

10. The system of claim 1, further comprising a driving module configured to (i) generate a driving current based on the first signal and (ii) drive the actuator arm based on the driving current.

11. A method comprising:
    generating a first signal to control a speed of an actuator arm of a rotating storage device;
    generating a first filtered output based on the first signal using a first filter;
    generating a second filtered output based on the speed of the actuator arm using a second filter; and
    estimating a force to move the actuator arm based on (i) the first filtered output and (ii) the second filtered output,
    wherein the first filter and the second filter include infinite impulse response (IIR) filters of $P^{th}$ order, where P is an integer greater than 1.

12. The method of claim 11, further comprising:
    generating an estimated force signal based on (i) the first filtered output and (ii) the second filtered output; and
    correcting the first signal based on the estimated force signal.

13. The method of claim 12, further comprising:
    generating a first input based on a proportional distribution of a second input that loads the actuator arm on a storage medium of the rotating storage device; and
    generating the first signal and the estimated force signal based on the first input when the actuator arm is in a parked position.

14. The method of claim 13, further comprising generating the first filtered output based on (i) the first input and (ii) a direct current (DC) component of a transfer function of the first filter.

15. The method of claim 13, further comprising:
    sensing a temperature of the rotating storage device;
    generating the first input and the first filtered output based on the temperature; and
    generating transfer functions of the first filter and the second filter based on the temperature.

16. The method of claim 11, further comprising generating the first signal based on a difference between (i) the speed of the actuator arm and (ii) a target speed of the actuator arm.

17. The method of claim 11, further comprising:
    generating P samples of each of the first signal and the first filtered output in response to the actuator arm moving from a parked position; and
    generating the first filtered output based on the P samples.

18. The method of claim 11, further comprising:
    generating a first input, a second input, and a third input based on coefficients of the first filter and the second filter when the actuator arm is in a parked position; and
    generating the first filtered output, the second filtered output, and the first signal based on the first input, the second input, and the third input, respectively.

19. The method of claim 18, further comprising:
generating P samples of each of the first filtered output, the second filtered output, and the first signal in response to the actuator arm moving from the parked position; and
generating the first input, the second input, and the third input based on the P samples of the first filtered output, the second filtered output, and the first signal, respectively.

20. The method of claim 11, further comprising:
generating a driving current based on the first signal; and
driving the actuator arm based on the driving current.

\* \* \* \* \*